US011216988B2

(12) United States Patent
Levinshtein et al.

(10) Patent No.: US 11,216,988 B2
(45) Date of Patent: Jan. 4, 2022

(54) SYSTEM AND METHOD FOR IMAGE PROCESSING USING DEEP NEURAL NETWORKS

(71) Applicant: L'OREAL, Paris (FR)

(72) Inventors: Alex Levinshtein, Thornhill (CA); Cheng Chang, Toronto (CA); Edmund Phung, Toronto (CA); Irina Kezele, Toronto (CA); Wenzhangzhi Guo, Mississauga (CA); Eric Elmoznino, Toronto (CA); Ruowei Jiang, Toronto (CA); Parham Aarabi, Richmond Hill (CA)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 16/753,214

(22) PCT Filed: Oct. 24, 2018

(86) PCT No.: PCT/CA2018/051345
§ 371 (c)(1),
(2) Date: Apr. 2, 2020

(87) PCT Pub. No.: WO2019/079895
PCT Pub. Date: May 2, 2019

(65) Prior Publication Data
US 2020/0320748 A1 Oct. 8, 2020

Related U.S. Application Data

(60) Provisional application No. 62/597,494, filed on Dec. 12, 2017, provisional application No. 62/576,180, filed on Oct. 24, 2017.

(51) Int. Cl.
G06K 9/46 (2006.01)
G06T 11/00 (2006.01)
(Continued)

(52) U.S. Cl.
CPC ........ *G06T 11/001* (2013.01); *G06K 9/00248* (2013.01); *G06K 9/00281* (2013.01);
(Continued)

(58) Field of Classification Search
CPC . G06T 11/001; G06T 7/11; G06T 7/90; G06T 1/20; G06T 2200/24;
(Continued)

(56) References Cited

U.S. PATENT DOCUMENTS 10,402,689 B1 * 9/2019 Bogdanovych ......... G06T 11/60
10,867,416 B2 * 12/2020 Shen ....................... G06T 11/00
2016/0180195 A1   6/2016 Martinson et al.

OTHER PUBLICATIONS

International Search Report and Written Opinion dated Jan. 31, 2019, in PCT/CA2018/051345, citing documents AA and AX-AZ therein, 8 pages.

(Continued)

*Primary Examiner* — Antonio A Caschera
(74) *Attorney, Agent, or Firm* — Oblon, McClelland, Maier & Neustadt, L.L.P.

(57) ABSTRACT

A system and method implement deep learning on a mobile device to provide a convolutional neural network (CNN) for real time processing of video, for example, to color hair. Images are processed using the CNN to define a respective hair matte of hair pixels. The respective object mattes may be used to determine which pixels to adjust when adjusting pixel values such as to change color, lighting, texture, etc. The CNN may comprise a (pre-trained) network for image classification adapted to produce the segmentation mask. The CNN may be trained for image segmentation (e.g. using coarse segmentation data) to minimize a mask-image gradient consistency loss. The CNN may further use skip connections between corresponding layers of an encoder stage and a decoder stage where shallower layers in the
(Continued)

encoder, which contain high-res but weak features are combined with low resolution but powerful features from deeper decoder layers.

29 Claims, 10 Drawing Sheets

(51) Int. Cl.
*G06T 7/11* (2017.01)
*G06T 7/90* (2017.01)
*G06K 9/00* (2006.01)
*G06K 9/62* (2006.01)
*G06N 3/08* (2006.01)
*G06T 1/20* (2006.01)

(52) U.S. Cl.
CPC ......... *G06K 9/4628* (2013.01); *G06K 9/6217* (2013.01); *G06K 9/6267* (2013.01); *G06N 3/08* (2013.01); *G06T 1/20* (2013.01); *G06T 7/11* (2017.01); *G06T 7/90* (2017.01); *G06T 2200/24* (2013.01); *G06T 2207/10016* (2013.01); *G06T 2207/10024* (2013.01); *G06T 2207/20081* (2013.01); *G06T 2207/20084* (2013.01)

(58) Field of Classification Search
CPC . G06T 2207/10016; G06T 2207/10024; G06T 2207/20081; G06T 2207/20084; G06K 9/00281; G06K 9/4628; G06K 9/6217; G06K 9/6267; G06N 3/08
See application file for complete search history.

(56) References Cited

OTHER PUBLICATIONS

Shelhamer E. et al., "Fully Convolutional Networks for Semantic Segmentation", IEEE Transactions on Pattern Analysis and Machine Intelligence, vol. 39, No. 4, Apr. 2017, 12 pages.
Xu, N. et al., "Deep Image Matting", IEEE Conference on Computer Vision and Pattern Recognition, Jul. 2017, pp. 311-320.
Simonyan, K. et al., "Very Deep Convolutional Networks for Large-Scale Image Recognition", Visual Geometry Group, Department of Engineering Science, 2015, 14 pages.
Andrew G. Howard et al., "MobileNets: Efficient convolutional neural networks for mobile vision applications", 2015 IEEE (CVPR), arXiv: 1704.04861v1 [cs.CV], Apr. 17, 2017, 9 pages.
Jonathan Long et al. , "Fully convolutional networks for semantic segmentation," in 2015 IEEE Conference on Computer Vision and Pattern Recognition (CVPR), Boston, MA, USA, 2015 pp. 3431-3440 and cover page doi: 10.1109/CVPR.2015.7298965.
Siyang Qin et al., "Automatic skin and hair masking using fully convolutional networks," 2017 IEEE International Conference on Multimedia and Expo (ICME), 2017, pp. 103-108 and cover page, doi: 10.1109/ICME.2017.8019339.
K. He, et al., "Guided Image Filtering," in IEEE Transactions on Pattern Analysis and Machine Intelligence, vol. 35, No. 6, pp. 1397-1409, Jun. 2013, doi: 10.1109/TPAMI.2012.213.
Y. Yacoob, et al., "Detection and analysis of hair," in IEEE Transactions on Pattern Analysis and Machine Intelligence, vol. 28, No. 7, pp. 1164-1169, Jul. 2006, doi: 10.1109/TPAMI.2006.139.
P. Aarabi, "Automatic Segmentation of Hair in Images," 2015 IEEE International Symposium on Multimedia (ISM), 2015, pp. 69-72, doi: 10.1109/ISM.2015.16.
K. Khan, et al., "Multi-class semantic segmentation of faces," 2015 IEEE International Conference on Image Proccessing (ICIP), 2015, pp. 827-831, doi: 10.1109/ICIP.2015.7350915.
K. Lee, et al., "Markov random field models for hair and face segmentation," 2008 8th IEEE International Conference on Automatic Face & Gesture Recognition, 2008, pp. 1-6, doi: 10.1109/AFGR.2008.4813431.
G. B. Huang, et al., "Towards unconstrained face recognition," 2008 IEEE Computer Society Conference on Computer Vision and Pattern Recognition Workshops, 2008, pp. 1-8, doi: 10.1109/CVPRW.2008.4562973.
Wang N., et al., "A Compositional Exemplar-Based Model for Hair Segmentation". In: Kimmel R., Klette R., Sugimoto A. (eds) Computer Vision—ACCV 2010. ACCV 2010. Lecture Notes in Computer Science, vol. 6494. Springer, Berlin, Heidelberg.
N. Wang, et al., "What are good parts for hair shape modeling?," 2012 IEEE Conference on Computer Vision and Pattern Recognition, 2012, pp. 662-669, doi: 10.1109/CVPR.2012.6247734.
W. Guo et al., "Hair Segmentation Using Heuristically-Trained Neural Networks," in IEEE Transactions on Neural Networks and Learning Systems, vol. 29, No. 1, pp. 25-36, Jan. 2018, doi: 10.1109/TNNLS.2016.2614653.
Chai, et al., AutoHair: Fully Automatic Hair Modeling from A Single Image. ACM Transactions on Graphics. 35. 1-12. 10.1145/2897824.2925961.
L.-C. Chen, et al., "Semantic image segmentation with deep convolutional nets and fully connected CRFs," in ICLR, 2015.
P. Krahenbuhl et al., "Efficient inference in fully connected CRFs with Gaussian edge potentials," in NIPS, 2011, pp. 109-117.
N. Xu, et al., "Deep image matting," in Computer Vision and Pattern Recognition, 2017.
K. Simonyan et al., "Very deep convolutional networks for large-scale image recognition," arXiv preprint, arXiv:1409.1556, 2014.
C. Rhemann, et al., "A perceptually motivated online benchmark for image matting," 2009 IEEE Conference on Computer Vision and Pattern Recognition, 2009, pp. 1826-1833, doi: 10.1109/CVPR.2009.5206503.
A. Kae, et al., "Augmenting CRFs with Boltzmann machine shape priors for image labeling," in CVPR, 2013.

* cited by examiner

SYSTEM AND METHOD FOR IMAGE PROCESSING USING DEEP NEURAL NETWORKS

CROSS-REFERENCE

This application claims, in respect of the United States, the domestic benefit of, and in respect of other jurisdictions, Paris convention priority to the following applications: 1) U.S. Provisional Application No. 62/576,180 filed Oct. 24, 2017 and entitled "A System and Method for Video Hair Coloration Using Deep Neural Networks"; and 2) U.S. Provisional Application No. 62/597,494 filed Dec. 12, 2017 and entitled "A System and Method for Real-time Deep Hair Matting on Mobile Devices" the entire contents of each application is incorporated herein by reference in respect of any jurisdiction where such incorporation is permitted.

FIELD

The present application relates to image processing to define a new image from a source image and more particularly to process an image using deep neural networks such as a convolutional neural network (CNN).

BACKGROUND

There are many scenarios where image processing is useful to analyze a source image to identify certain subject matter therein and, at least in a subset of those scenarios, to make corrections or other changes to produce a new image. Image processing may be used to classify an object represented in an image and/or to identify the location of the object in an image. Image processing may be used to correct or change attributes (e.g. a respective value of a pixel) of an image such as for changes to color, texture, lighting, brightness, contrast and other attributes. Other changes may include adding or subtracting objects to or from the image, changing shapes of objects, etc.

In one example, image processing may be used to color hair of a subject in a source image to produce a colored hair image.

Image processing is often resource intensive for computing devices, particularly common mobile devices such as smartphones, tablets, etc. This is especially true when processing video comprising a series of images in real time.

SUMMARY

The following description relates to implementing deep learning and particularly to implementing deep learning on a mobile device. A goal of the present disclosure is to provide a deep learning environment to process live video, for example, to segment an object such as hair and change hair color. A person of skill in the art will appreciate that objects other than hair may be detected and color or other respective attributes may be changed. Video images (e.g. frames) may be processed using a deep neural network to define a respective hair matte (e.g. an object mask) of hair pixels (e.g. object pixels) from each video image. The respective object mattes may be used to determine which pixels to adjust when adjusting an attribute of the video image such as color, lighting, texture, etc. In one example for hair coloring, a deep learning neural network, for example, a convolutional neural network, is configured to classify pixels of a source image to determine whether each is a hair pixel and to define a hair mask. The mask is then used to change an attribute of the source image to produce a new image. The CNN may comprise a pre-trained network for image classification adapted to produce the segmentation mask. The CNN may be further trained using coarse segmentation data and to minimize a mask-image gradient consistency loss when trained. The CNN may further use skip connections between corresponding layers of an encoder stage and a decoder stage where shallower layers in the encoder, which contain high-res but weak features are combined with low resolution but powerful features from deeper layers in the decoder.

Such a mask may be used to, directly or indirectly, distinguish other objects. A hair mask may define a margin or edge of an individual, where subject matter outside the hair mask may be background for example. Other objects which may be detected include skin, etc.

There is provided a computing device to process an image comprising: a storage unit to store and provide a convolutional neural network (CNN) configured to classify pixels of the image to determine whether each of the pixels is an object pixel or not an object pixel to define an object segmentation mask for an object in the image, wherein the CNN comprises a pre-trained network for image classification adapted to define the object segmentation mask and wherein the CNN is further trained using segmentation data; and a processing unit coupled to the storage unit configured to process the image using the CNN to generate the object segmentation mask to define a new image.

The CNN may be adapted to minimize a mask-image gradient consistency loss when trained using segmentation data.

The CNN may be adapted to use skip connections between layers in an encoder stage and corresponding layers in a decoder stage to combine low resolution but powerful features and high resolution but weak features when upsampling in the decoder stage to define the object segmentation mask.

The mask-image gradient consistency loss $L_c$ may be defined as:

$$L_c = \frac{\sum M_{mag}[1-(I_x M_x + I_y M_y)^2]}{\sum M_{mag}},$$

where $I_x, I_y$ are normalized image gradient and $M_x, M_y$ are normalized mask gradient and $M_{mag}$ is mask gradient magnitude.

The mask-image gradient consistency loss may be combined with a binary cross entropy loss with a weight w, to minimize an overall loss L when training where L is defined as $L = L_M + wL_c$.

The CNN may be trained using noisy and coarse segmentation data. The segmentation data may be crowd-sourced segmentation data.

The object may be hair. The processing unit may be configured to define the new image from the image by applying a change to pixels in the image selected using the object segmentation mask. The change may be a change of color, (e.g. when the object is hair to simulate a change of hair color).

The CNN may comprises a trained network configured to run on a mobile device with limited computational power to produce the new image as a video image in real time.

The processing unit may be configured to provide an interactive graphical user interface (GUI) to display the image and the new image. The interactive GUI may be configured to receive input to determine the change to define the new image. The processing unit may be configured to analyze pixels of the object in the image using the object segmentation mask to determine one or more candidates for the change. The interactive GUI may be configured to present the one or more candidates to receive input to select a one of the candidates to apply as the change.

The image may be a selfie video.

There is provided a computing device to process an image comprising: a storage unit to store and provide a convolutional neural network (CNN) configured to classify pixels of the image to determine whether each of the pixels is a hair pixel or not a hair pixel, the CNN being trained to minimize a mask-image gradient consistency loss when trained with segmentation data to define a hair segmentation mask; and a processing unit and coupled to the storage unit, the processing unit configured define and present a colored hair image by applying a new hair color to hair pixels in the image using the hair segmentation mask.

There is provided a computing device to process an image comprising: a processing unit, a storage unit coupled to the processing unit and an input device coupled to at least one of the processing unit and the storage unit, the storage unit storing instructions which when executed by the processing unit configure the computing device to: receive the image via the input device; define a hair segmentation mask that identifies hair pixels in the image; define a colored hair image by applying a new hair color to hair pixels in the image using the hair segmentation mask; and provide the colored hair image for output to a display device; and wherein the hair segmentation mask is defined by: processing the image using a convolutional neural network (CNN) stored by the storage unit to apply a plurality of convolutional (conv) filters in a succession of conv layers to detect respective features, where a first set of conv layers in the succession provides output which down samples the image from a first image resolution down to a minimum resolution and a second set of conv layers in the succession upsamples the output back to the first image resolution, and the CNN being trained to minimise a mask-image gradient consistency loss to define the hair segmentation mask.

There is provided a computing device configured to generate a CNN trained to process images to define an object segmentation mask, the computing device comprising: a storage unit to receive a CNN configured for image classification and configured to execute on a run time computing device having limited computational power; a processing unit configured to provide an interactive interface to receive input and display output, the processing unit configured to: receive input to adapt the CNN to define an object segmentation mask and store the CNN as adapted to the storage unit; and receive input to train the CNN as adapted using segmentation training data labelled for object segmentation to generate the CNN to process images to define the object segmentation mask. The processing unit may be configure to receive input to adapt the CNN to, at least one of: use a minimise a mask-image gradient consistency loss function defined to minimize the mask-image gradient consistency loss when training; and use skip connections between layers in an encoder stage and corresponding layers in a decoder stage to combine low resolution but powerful features and high resolution but weak features when upsampling in the decoder stage; and store the CNN as adapted to the storage unit.

There is provided a method to generate a CNN trained to process images to define an object segmentation mask. The method comprises: obtaining a CNN configured for image classification and configured to execute on a computing device having limited computational power; adapting the CNN to define an object segmentation mask; and training the CNN as adapted using segmentation training data labelled for object segmentation to define the object segmentation mask. The CNN may be trained using a mask-image gradient consistency loss function defined to minimize the mask-image gradient consistency loss to generate the CNN to process images to define the object segmentation mask.

The CNN may be pre-trained for image classification and the step of training further trains the CNN as pre-trained. The segmentation training data may be noisy and coarse segmentation training data (e.g. defined from crowd sourced data).

The method may comprise adapting the CNN to use skip connections between layers in an encoder stage and corresponding layers in a decoder stage to combine low resolution but powerful features and high resolution but weak features when upsampling in the decoder stage.

The mask-image gradient consistency loss function may combined with a binary cross entropy loss function to minimize a combined loss. The method may comprise providing the CNN to process images to define the object segmentation mask for storing on a mobile device.

There is provided a method comprising: storing in a storage unit of a computing device a convolutional neural network (CNN) configured to classify pixels of an image to determine whether each of the pixels is an object pixel or not an object pixel to define an object segmentation mask for an object in the image, wherein the CNN comprises a pre-trained network for image classification adapted to define the object segmentation mask and trained with segmentation data.

The CNN may be further trained to minimize a mask-image gradient consistency loss when trained using segmentation data; and processing an image via a processing unit of the computing device using the CNN to generate the object segmentation mask to define a new image.

There is provided a method to process an image. The method comprises: storing in a storage unit of a computing device a convolutional neural network (CNN) configured to classify pixels of the image to determine whether each of the pixels is a hair pixel or not a hair pixel, the CNN being trained to minimize a mask-image gradient consistency loss when trained with segmentation data to define a hair segmentation mask; and defining and presenting by a processing unit of the computing device coupled of the storage unit a colored hair image by applying a new hair color to hair pixels in the image using the hair segmentation mask.

There is provided a method to process an image comprising: receiving via a processing unit the image; defining via the processing unit a hair segmentation mask that identifies hair pixels in the image; defining via the processing unit a colored hair image by applying a new hair color to hair pixels in the image using the hair segmentation mask; and providing via the processing unit the colored hair image for output to a display device. The hair segmentation mask is defined by: processing the image using a convolutional neural network (CNN) stored by a storage unit coupled to the processing unit to apply a plurality of convolutional (conv) filters in a succession of conv layers to detect respective features and the CNN being trained to with noisy and course segmentation data and to minimise a mask-image gradient consistency loss to define the hair segmentation mask.

A first set of conv layers in the succession may provide output which down samples the image from a first image resolution down to a minimum resolution and a second set of conv layers in the succession upsamples the output back to the first image resolution, the CNN using skip connections between corresponding conv layers from the first set and the second set.

The CNN may comprise an upsampling function interspersed before an initial layer of the second set of conv layers and before respective subsequent layers of the second set of conv layers to upsample output to the first image resolution.

The upsampling function may use respective skip connections, each of the respective skip connections combining: a first activation map that is output from an adjacent conv layer in the succession as input to the next conv layer of the second set of conv layers; and a second activation map that is output from an earlier conv layer in the first set of conv layers, where the second activation map has a larger image resolution than the first activation map. Each of the respective skip connections may be defined to add an output of a conv 1×1 filter applied to the second activation map with an output of an upsampling function applied to the first activation map to increase resolution of the first activation map to the larger image resolution.

The method may comprise presenting by the processing unit a graphical user interface (GUI) via the display device, the GUI comprising a first portion to view the image and a second portion to view the colored hair image simultaneously.

The method may comprise applying a lighting conditions treatment to the new hair color in the colored hair image to show the new hair color in a different lighting condition.

The new hair color may be a first new hair color and the colored hair image may be a first colored hair image. in such a case, the method may comprise: defining and presenting by the processing unit a second colored hair image by applying a second new hair color to hair pixels in the image using the hair segmentation mask and by providing the second colored hair image for output to the display device. The method may comprise presenting by the processing unit a two new color GUI via the display device, the two new color GUI comprising a first new color portion to view the first colored hair image and a second new color portion to view the second colored hair image simultaneously.

The method may comprise: analyzing by the processing unit the image for color including a current hair color of hair pixels in the image; determine one or more suggested new hair colors; and presenting the suggested new hair colors via an interactive portion of the GUI to select the new hair color to define the colored hair image.

The processing unit may comprise a graphics processing unit (GPU) to execute the CNN and the processing unit and storage unit may be provided by a computing device comprising one of a smartphone and a tablet. The method image may be one of a plurality of video images of a video and the method may comprise processing by the processing unit the plurality of video images to change hair color.

The CNN may comprise a MobileNet based model adapted to classify pixels of the image to determine whether each of the pixels is a hair pixel. The CNN may be configured as a depthwise separable convolution neural network comprising convolutions in which individual standard convolutions are factorized into a depthwise convolution and a pointwise convolution, the depthwise convolution limited to applying a single filter to each input channel and the pointwise convolution limited to combining outputs of the depthwise convolution.

These and other aspects will be apparent to a person of ordinary skill in the art including computer program product aspects where a (non-transient) storage unit stores instructions, which when executed by a processing unit, configure operations of a computing device to perform any of the computer-implemented method aspects herein.

Figure 1:
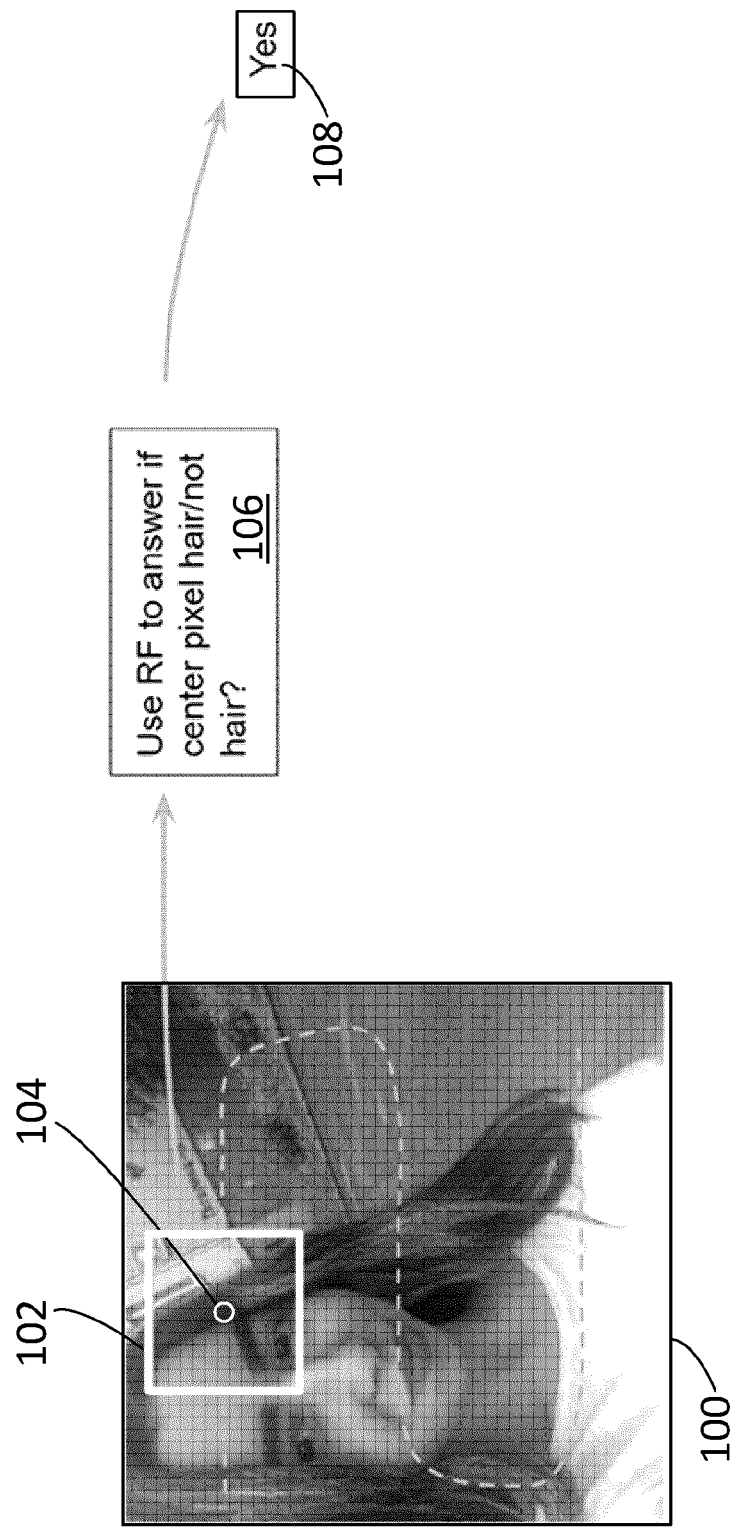
FIG. 1 is sketch of the application of a random forest based classifier to classify pixels of an image in accordance with an example herein.

The present inventive concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

DETAILED DESCRIPTION

Deep Learning and Segmentation

Real-time image segmentation is an important problem in computer vision with a multitude of applications. Among them is the segmentation of hair for live color augmentation in beauty applications. This use case, however, presents additional challenges. First, unlike many objects with simple shape, hair has a very complex structure. For realistic color augmentation, a coarse hair segmentation mask is insufficient. One needs a hair matte instead. Secondly, many beauty applications run on mobile devices or in web browsers, where powerful computing resources are not available. This makes it more challenging to achieve real-time performance. There is described herein a system and method, etc. to accurately segment hair at over 30 fps on a mobile device.

The hair segmentation system and method is based on convolutional neural networks (CNNs). Most modern CNNs cannot run in real-time even on powerful GPUs and may occupy a large amount of memory. A target of the system and method herein is real-time performance on a mobile device. In a first contribution there is shown how to adapt the recently proposed MobileNets™ architecture of Google Inc for hair segmentation, which is both fast and compact enough to be used on a mobile device. Details regarding MobileNets may be found in "MobileNets: Efficient Convolutional Neural Networks for Mobile Vision Applications" of Howard et al., arXiv:1704.04861v1 [cs:CV] 17 Apr. 2017 incorporated herein by reference.

In the absence of detailed hair segmentation ground truth, the network is trained on noisy and coarse crowd-sourced data (coarse segmentation data where the labelling is not finely accurate at the pixel level). A coarse segmentation result, however, is esthetically unpleasing for hair color augmentation purposes. For realistic color augmentation, a more accurate hair matte yields improved results. In a second contribution, we propose a method for obtaining more accurate hair mattes in real-time without the need for accurate hair matte training data. First, it is shown how to modify the baseline network architecture to have the capacity for capturing fine-level details. Next, by adding a secondary loss function that promotes perceptually appealing matting results, it is shown that the network can be trained to yield detailed hair mattes using only coarse hair segmentation training data. We compare this approach to a simple guided filter (an edge preserving filter with a liner run time complexity with respect to image size) post-processing and show that it yields more accurate and sharper results.

Before describing deep learning and segmentation in detail, earlier approaches to developing a hair coloring solution for video on mobile devices were undertaken and evaluated by the present applicant. By way of an example, a classifier was developed incorporating a random forest (RF) model based on features of color histogram, position and gradient factors. The classifier processed the pixels successively, sliding a filter or kernel around the image, as is well-known, to determine whether a central pixel in the filter is a hair/not hair pixel. A sketch is shown in FIG. 1 where image 100 is processed by scanning a filter 102 over the image to successively process pixels using an RF classifier 104 that outputs whether a center pixel 106 of the filter 102 is a hair/not hair pixel. The output 108 may be used to define a hair matte (not shown) where the output is a data value of a corresponding pixel in the hair matte. It is understood that in the sketch of FIG. 1, filter 102, center pixel 106, and the illustrated path are not to scale. Results were not promising in neither speed nor accuracy so the approach was discarded in favor of deep learning.

A reason that deep learning was not selected in the first place is that it is still quite challenging to make it run in real-time on mobile devices. Most deep learning architectures don't even run in real-time on powerful GPUs. An initial approach adapted a Visual Group Geometry neural net architecture, namely VGG16. A VGG16 based classification network pre-trained on ImageNet (a large visual database (an open source dataset) designed for use with object recognition software research) was adapted by removing the last 3 layers (e.g. full connected layers and output layer) and converting to a semantic segmentation network by adding several convolutional (often abbreviated herein as "conv") transpose layers. Though the results (output) were quite good, processing was slow, especially on a mobile device (over a second per frame). The approach thus shifted to find a lighter architecture that is smaller in size and performs fewer operations to enhance processing speeds, etc.

MobileNet Architecture

Figure 2:
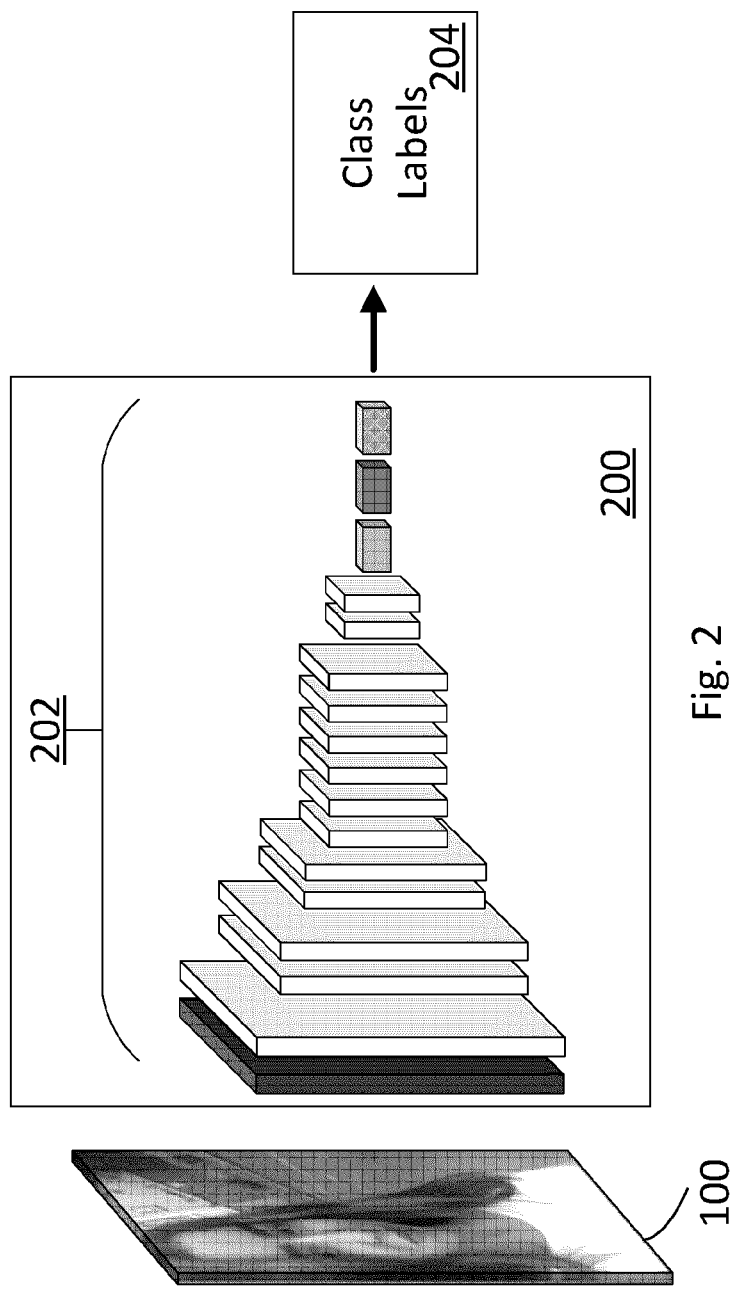
FIG. 2 is an illustration of a deep neural network architecture in accordance with the MobileNet model from Google Inc.

MobileNet architecture of Google Inc. is a light weight, pre-trained, deep learning neural network architecture implemented for mobile devices. FIG. 2 is a schematic illustration of the MobileNet network 200 showing source image 100 as input, network layers/layer groups 202 in accordance with the pre-trained CNN of MobileNet and class labels 204 as the output of the MobileNet network 200. Input images processed by MobileNet are 224×224 pixels in resolution with 3 colour values (i.e. 224×224×3).

The MobileNet architecture employs depthwise separable convolutions (a form of factorized convolutions) to minimize processing operations (i.e. floating point operations, multiplications and/or adds, etc.). Depthwise separable convolutions factorize (e.g. spit up functions of) a standard convolution into a depthwise convolution and a 1×1 convolution (also referenced as a "pointwise convolution") with a view to making processing faster by reducing or minimizing the number of operations required. The depthwise convolution applies a single filter to each input channel. The pointwise convolution then applies a 1×1 convolution to combine the outputs of the depthwise convolution, separating filtering and combining functions/operations into two steps rather than a single filtering and combining operation performed by standard convolutions. Thus the structures in architecture 200 may include two conv layers per structure, one depthwise conv layer and one pointwise conv layer, to define or illustrate a "layer group".

Table 1 shows activation map size information and processing operation(s) information for each of the 17 layers/layer groups 202 beginning from left to right through to the Softmax operation. MobileNet, strictly, has 28 conv layers from its first full conv layer and its fully connected layer.

TABLE 1

| | | Processing Operation(s) | | | | |
|---|---|---|---|---|---|---|
| Layers/Layer Groups | Map Size | Conv 3 × 3 | Depthwise Conv 3 × 3 + BN + ReLU + Conv 1 × 1 + BN + ReLU | Average Pool 7 × 7 | Fully Connected | Softmax |
| 1 | 112 × 112 × 32 | X | | | | |
| 2 | 112 × 112 × 64 | | X | | | |

TABLE 1-continued

| | | Processing Operation(s) | | | | |
|---|---|---|---|---|---|---|
| Layers/Layer Groups | Map Size | Conv 3 × 3 | Depthwise Conv 3 × 3 + BN + ReLU + Conv 1 × 1 + BN + ReLU | Average Pool 7 × 7 | Fully Connected | Softmax |
| 3-4 | 56 × 56 × 128 | | X | | | |
| 5-6 | 28 × 28 × 256 | | X | | | |
| 7-12 | 14 × 14 × 512 | | X | | | |
| 13-14 | 7 × 7 × 1024 | | X | | | |
| 15 | 1 × 1 × 1024 | | | X | | |
| 16 | 1 × 1 × 1024 | | | | X | |
| 17 | 1 × 1 × 1024 | | | | | X |

In Table 1, BN represents a batch normalization (batchnorm) function to normalize input (to a subsequent operation) by adjusting and scaling the activations (e.g. individual values in the activation map provided from one layer/operations to the next). ReLU is a rectifier and represents a rectified linear units function (e.g. max function(X, 0) for input X such that all negative values of X are set to 0). Downsampling is handled with strided convolution in the depth wise convolutions as well as in the first layer. A final downsample by Average Pool 7×7 uses a downsampling function based on averaging values in a 7×7 array. Softmax, or the normalized exponential function, "squashes" a K-dimensional vector z of arbitrary real values to a K-dimensional vector σ (z) of real values, where each entry is in the range (0, 1), and all the entries add up to 1 (e.g. a scaling and normalizing function). Usefully, the output can be used to represent a categorical distribution—a probability distribution over K different possible outcomes (categories or classes) and is thus used frequently with neural network classifiers classifying to K classes. The respective 17 layers are grayscale and pattern coded in FIG. 2 by processing operation(s).

Figure 3:
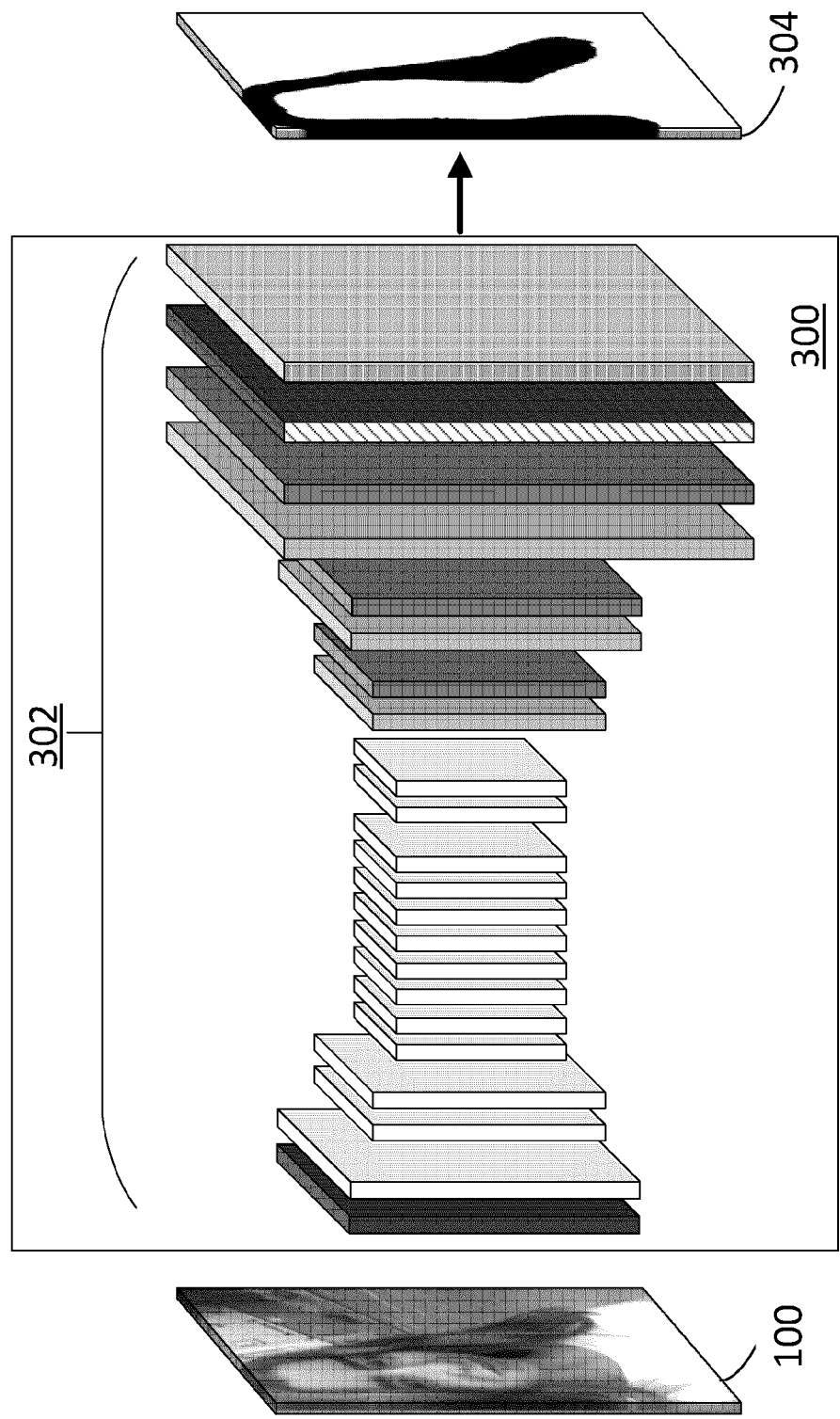
FIG. 3 is an illustration of a deep neural network architecture configured to process an image and produce an image mask as output in accordance with an example herein.

FIG. 3 is an illustration showing an adapted deep learning network 300 with layers/layer groups 302. Network 300 also receives source image 100 as input for processing. Network 300 (e.g. the layers/layer groups 302 thereof) are adapted to output a hair mask 304. Table 2 shows activation map size information and processing operation(s) information for each of the 22 layers/layer groups 302 beginning from left to right.

Network 300 is similar to Network 200 but is adapted. The downsampling to 14×14 resolution and then to 7×7 resolution of network 200 is avoided and the minimum resolution is 28×28 in layers 5-14. The final three layers are removed (i.e. the two fully connected layers and the Softmax layer though a final Softmax layer is also used). To preserve fine details the output feature resolution is increased by changing the step size of the last two layers with step size of 2 to 1. Due to the use of pre-trained weights on ImageNet incorporated in the base architecture of MobileNet, the kernels for the layers with updated resolution are dilated by their scale factor with respect to their original resolution. Namely, kernels for layers that increased by a factor of 2 are dilated by 2 and kernels for layers that increased by a factor of 4 are dilated by 4. This yields a final minimum resolution of 28×28 in the encoder stage. Layers/layer groups 15 and forward may define a decoder stage.

Layers 2-14, 16, 18 and 20 incorporate depthwise separable convolutions—factorized standard convolutions where a depthwise convolution applies a single filter to each input channel and a pointwise convolution combines the outputs of the depthwise convolution. Depthwise separate convolutions have the effect of reducing computation and model size, both of which are assistive for processing in a mobile device environment.

The decoder phase takes the above CNN features from the encoder phase as input and upsamples them to a hair mask at the original 224×224 resolution. Upsampling is performed at layers 15, 17 and 19, alternating with further feature analysis in layers 16, 18 and 20. Upsampling is performed

TABLE 2

| | | Processing Operation(s) | | | | | |
|---|---|---|---|---|---|---|---|
| Layer/ Group | Map Size | Conv 3 × 3 | Depthwise Conv 3 × 3 + BN + ReLU + Conv 1 × 1 + BN + ReLU | Up sampling | Depthwise Conv 3 × 3 + Conv 1 × 1 + BN + ReLU | Conv 1 × 1 + ReLU | Soft max |
| 1 | 112 × 112 × 32 | X | | | | | |
| 2 | 112 × 112 × 64 | | X | | | | |
| 3-4 | 56 × 56 × 128 | | X | | | | |
| 5-6 | 28 × 28 × 256 | | X | | | | |
| 7-12 | 28 × 28 × 512 | | X | | | | |
| 13-14 | 28 × 28 × 1024 | | X | | | | |
| 15 | 56 × 56 × 1024 | | | X | | | |
| 16 | 56 × 56 × 64 | | | | X | | |
| 17 | 112 × 112 × 64 | | | X | | | |
| 18 | 112 × 112 × 64 | | | | X | | |
| 19 | 224 × 224 × 64 | | | X | | | |
| 20 | 224 × 224 × 64 | | | | X | | |
| 21 | 224 × 224 × 2 | | | | | X | |
| 22 | 224 × 224 × 2 | | | | | | X | by a simplified version of an inverted MobileNet architecture. At each stage, operations upsample the previous layer by a factor of 2 by replicating each pixel in a 2×2 neighborhood. Then, separable depthwise convolution is applied, followed by pointwise 1×1 convolutions with 64 filters, followed by ReLU as shown in Table 2. Operations conclude in layer/layer group 21 by adding a 1×1 convolution with Softmax activation and 2 output channels for hair/non-hair.

Though not shown, the network is trained by minimizing the binary cross entropy loss $L_M$ between predicted and ground truth masks. Binary cross entropy is discussed further below in relation to FIG. 5.

Hence, FIG. 3 shows a fully convolutional MobileNet architecture for hair segmentation. The model thus defined and trained applies a plurality of convolutional (conv) filters in a succession of conv layers to detect respective features, where a first set of conv layers in the succession provides output which down samples (and encodes) the image from a first image resolution down to a minimum resolution and a second set of conv layers in the succession up samples the output back to the first image resolution. The model has upsampling operations interspersed before an initial layer of the second set of conv layers and before respective subsequent layers of the second set of conv layers to upsample output to the first image resolution. The first set may define an encoder stage and the second set a decoder stage.

Training deep neural networks requires a large amount of data. While there are large datasets for general semantic segmentation, these datasets are much less popular for hair segmentation. Moreover, unlike some objects like cars, which have a relatively simple shape, hair shape is very complex. Therefore, obtaining precise ground truth segmentation for hair is even more challenging To cope with this challenge a pre-trained network on ImageNet was used. It was further fine-tuned on hair segmentation data. Nevertheless, several thousands of training images are still needed. Data was crowd-sourced using a hair coloring app where users have to manually mark their hair. While getting this data is inexpensive, the resulting hair segmentation labels are very noisy and coarse. This source data may be manually cleaned by only keeping the images of human faces with sufficiently good hair masks. This is considerably faster than marking the hair from scratch or fixing incorrect segmentations. Two in-house sets of test data are similarly defined.

The above network 300 was implemented on an Apple iPad Pro 12.9 (2015) incorporating the Core ML™ library from Apple Corporation. Core ML automatically generates the MobileNet class from the MobileNet model and may be adapted as described. To take advantage of parallelization, the model was processed using the iPad's GPU and its related memory. It is noted that for some implementations to achieve desired processing the CNN may be processed (e.g. executed) by a GPU and in others it may be sufficient to process using a CPU of the computing device.

Due to the compactness of the architecture (300) and usage of the Core ML library, a forward pass over a single image takes only 60 ms. The network was also implemented using Tensorflow™ (an open source software library for high performance numerical computation with support for machine learning and deep learning originally develop by Google Inc.). Comparable processing was slower at ~300 ms. While Tensorflow has NEON™ optimizations (NEON technology is an advance is single instruction multiple data (SIMD) architecture extension for certain processors of Arm Limited) it is not optimized for graphics processing. It is recognized that GPUs on modern phones and tablets do pack considerable power.

This model yields already very good qualitative and quantitative results as shown in Table 3 where In-house Set 1 comprises 350 face cropped images. It is manually annotated from crowd sourced data and is similar to the training data used. In-house set 2 is 108 face images in 3:4 aspect (from the source input device) and is manually labeled. In-house set 1 has coarser manual labeling and in-house set 2 is finer manual labeling with neither set having fine labelling.

TABLE 3

| Test Set | Precision | Recall | F1 Score | IoU | Performance | Accuracy |
| --- | --- | --- | --- | --- | --- | --- |
| In-house Set 1 | 0.89406 | 0.93423 | 0.91045 | 0.84302 | 0.77183 | 0.95994 |
| In-house Set 2 | 0.904836 | 0.92926 | 0.914681 | 0.84514 | 0.76855 | 0.95289 |

However this approach still does not capture all the hair, and provides a coarse and blobby mask only rather than an accurate alpha matte. Post-processing the resulting mask using guided filtering to make it more visually appealing corrects only minor errors as described further below.

There is a desire to improve the results to obtain truer (and preferably true) matting using CNNs. Two challenges exist in this framework—the CNN 300 downsampled the image quite heavily in the encoding stage, and thus the resulting masks cannot be expected to contain very high resolution detail. As well, neither training data nor test data is available at sufficient accuracy, as mentioned, to train and evaluate a matting method.

To address the first issue of downsampling skip connections are added to the architecture to redefine the upsampling operations. By adding skip connections, powerful but low-res features are combined with weaker but higher-res features. Note that the architecture has reverted to the original encoder architecture, going all the way to 7×7 resolution, since due to the added skip-connections there is no longer a need at restricting the downsampling. Fewer skip-connections would be employed if the architecture of FIG. 3 was adapted and resolution was stopped at 28×28, for example. This way, shallower layers in the encoder, which contain high-res but weak features are combined with low-res but powerful features from deeper layers. The layers are combined by first applying a 1×1 convolution to the incoming encoder layers to make the output depth compatible with the incoming decoder layers (64 for the three outer skip connections and 1024 for the inner skip connection) and then merging the layers using addition. For each resolution, the deepest encoder layer at that resolution is taken for skip connection.

Figure 4:
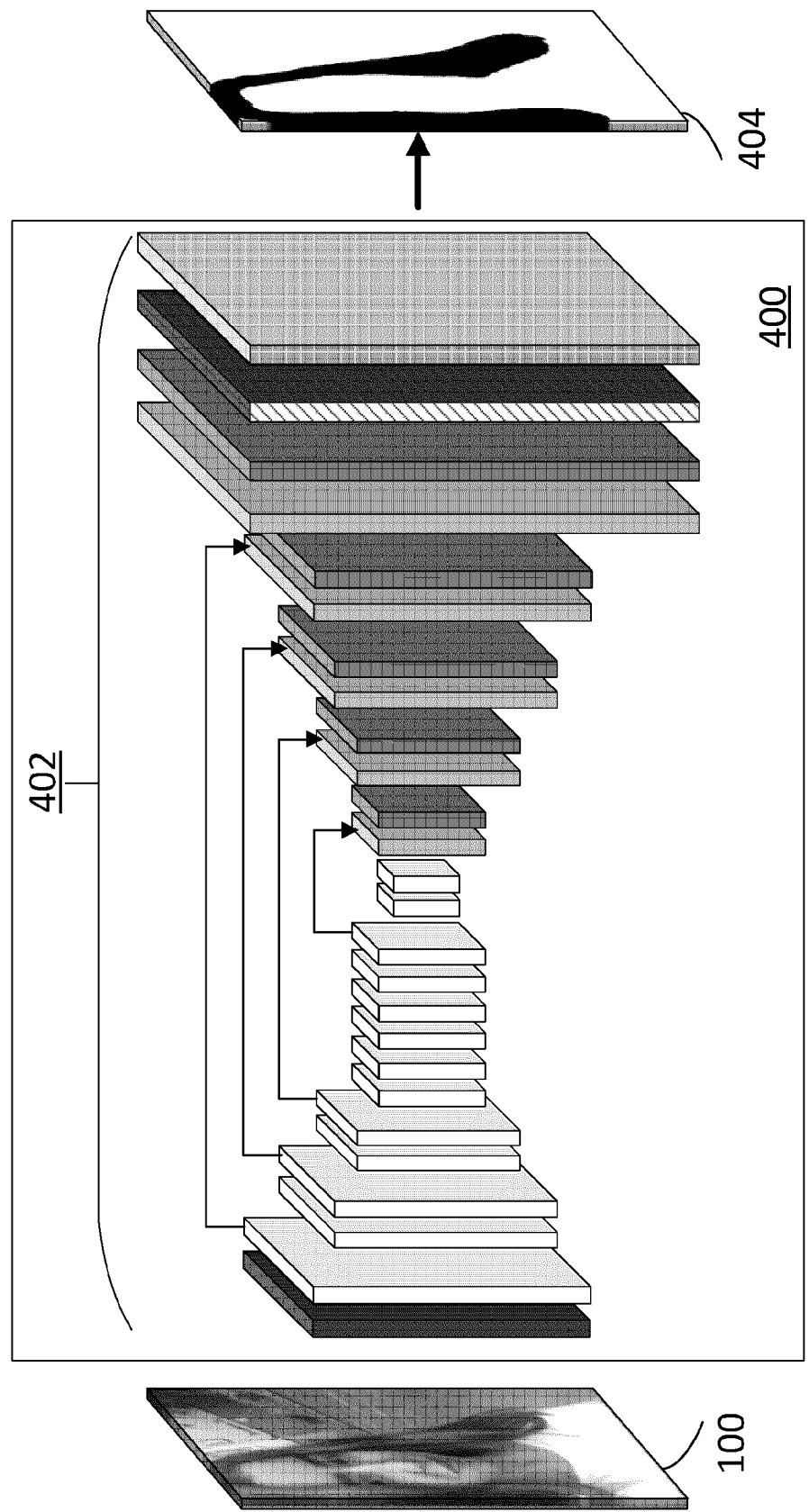
FIG. 4 is an illustration of a deep neural network architecture configured to use skip connections to process an image and produce an image mask as output in accordance with an example herein.

FIG. 4 is an illustration showing an adapted deep learning network 400 with layers/layer groups 402. Network 400 also receives source image 100 as input for processing. Network 400 (e.g. the layers/groups 402 thereof) are adapted to output a hair mask 404.

Table 4 shows activation map size information and processing operation(s) information for each of the 26 layers/layer groups 402 beginning from left to right.

In the model of both network 300 and network 400, each of the plurality of conv filters generates an activation map and the activation map generated by one conv layer is output to provide an input to a next conv layer in the succession. The plurality of conv filters comprises a first set of conv filters and a second set of conv filters such that: the first set of conv filters processes the image in the first set of layers (e.g. in layers 2-14 of network 400) such as to comprise an encoder; and the second set of conv filters processes the image in the second set of layers (e.g. in layers 16, 18, 20, 22 and 24 in network 400) such as to comprise a decoder. The hair segmentation mask is defined from a final activation map output from a final conv layer (e.g. from layer 25) of the succession.

The model of network 300 or network 400 may comprise a normalization function and a rectifier function in succession interspersed with the first set of conv filters to normalize and linearly rectify output. The model may comprise the rectifier function interspersed with the second set of conv filters to linearly rectify output. In the model of network 300 or network 400 the first set of layers comprises: an initial layer defined by an initial conv 3×3 filter; and a plurality of subsequent depthwise separable convolutions each defined by, in succession, a respective depthwise conv 3×3 filter, a batch normalization function and a rectified linear units function, and a conv 1×1 filter followed by the batch normalization and the rectified linear units function.

In the model of network 300 or network 400 the second set of layers comprises: a plurality of initial layers in succession each defined by a respective depthwise conv 3×3 filter, a conv 1×1 filter and a rectified linear units function; and a final layer defined by a final conv 1×1 filter and the rectified linear units function.

FIG. 4 shows upsampling operations at layers 15, 17, 19, 21 and 23. Upsampling at layers 15, 17, 19 and 21 includes performing a skip connection with an output map of a previous layer. The map of a previous layer has a resolution equal to the target resolution. The upsampling function at these layers performs a conv 1×1 operation on the map of an earlier corresponding layer of the encoder stage to combine channel information and performs an upsample operation (e.g. 2×2 as described) on the adjacent layer's activation map normally provided as input to the respective layer such that it has the same resolution as the map from the earlier layer. The output of the conv 1×1 operation and upsampling operation are added.

So the upsampling function uses a respective skip connection, where each of the respective skip connections combines a first activation map output from an adjacent conv layer in the succession as input to the next conv layer of the second set of conv layers; and a second activation map output from an earlier conv layer in the first set of conv layers, where the second activation map has a larger image resolution than the first activation map. Each of the respective skip connections is defined to add an output of a conv 1×1 filter applied to the second activation map with an output of the upsampling function applied to the first activation map to increase resolution of the first activation map to the larger image resolution. Lastly, the hair segmentation map is defined by applying a Softmax (normalized exponential function) to the final activation map to define values between 0 and 1 for each pixel of the hair segmentation map.

The quantitative results of this approach are shown in Table 5:

TABLE 4

| Layer/Group | Map Size | Conv 3 × 3 | Depthwise Conv 3 × 3 + BN + ReLU + Conv 1 × 1 + BN + ReLU | Up sampling | Depthwise Conv 3 × 3 + Conv 1 × 1 + BN + ReLU | Conv 1 × 1 + ReLU | Soft max |
|---|---|---|---|---|---|---|---|
| | | | | Processing Operation(s) | | | |
| 1 | 112 × 112 × 32 | X | | | | | |
| 2 | 112 × 112 × 64 | | X | | | | |
| 3-4 | 56 × 56 × 128 | | X | | | | |
| 5-6 | 28 × 28 × 256 | | X | | | | |
| 7-12 | 14 × 14 × 512 | | X | | | | |
| 13-14 | 7 × 7 × 1024 | | X | | | | |
| 15 | 14 × 14 × 1024 | | | X | | | |
| 16 | 14 × 14 × 64 | | | | X | | |
| 17 | 28 × 28 × 64 | | | X | | | |
| 18 | 28 × 28 × 64 | | | | X | | |
| 19 | 56 × 56 × 64 | | | X | | | |
| 20 | 56 × 56 × 64 | | | | X | | |
| 21 | 112 × 112 × 64 | | | X | | | |
| 22 | 112 × 112 × 64 | | | | X | | |
| 23 | 224 × 224 × 64 | | | X | | | |
| 24 | 224 × 224 × 64 | | | | X | | |
| 25 | 224 × 224 × 2 | | | | | X | |
| 26 | 224 × 224 × 2 | | | | | | X |

TABLE 5

| Test Set | Precision | Recall | F1 Score | IoU | Performance | Accuracy |
|---|---|---|---|---|---|---|
| In-house Set 1 | 0.88237 | 0.94727 | 0.91024 | 0.84226 | 0.770518 | 0.95817 |
| In-house Set 2 | 0.908239 | 0.94196 | 0.92320 | 0.85971 | 0.79548 | 0.95699 |

Moreover, due to the decrease in the final encoder resolution, the above architecture is much faster even though it contains additional decoder layers. A forward pass using Core ML over a single image takes 30 ms on Apple iPad Pro 12.9 (2015).

From an accuracy point of view, while it does seem better on the 2nd set than the model without skip connections, the results on the first set are inconclusive. This illustrates the second point above—that the coarse segmentation data has limited accuracy and this does not only impede training but testing as well.

It is contended that quantitative evaluation with such data has more or less reached its capacity at the current performance level. Qualitatively, however, this architecture also seems only marginally better. One possible explanation is that while the skip-connections architecture now has the capacity to learn fine-level details, these details are not present in our current training data making the resulting network output masks that are just as coarse as those in the training set.

Evaluating and minimizing the mask-image gradient consistency loss

Given the training and test data available, the CNN is limited to learning hair matting using only coarse segmentation training data. Motivated by the work of Rhemann et al., there is added a perceptually inspired measure of mask correctness. To that end, there is added a measure of consistency between the mask and images gradients. The distance (loss) measure is as follows.

Mask-image gradient consistency loss is shown in Eq. 1:

$$L_c = \frac{\sum M_{mag}[1 - (I_x M_x + I_y M_y)^2]}{\sum M_{mag}}, \quad \text{(Eq. 1)}$$

where $I_x, I_y$ are normalized image gradient and $M_x, M_y$ are normalized mask gradient and $M_{mag}$ is mask gradient magnitude. The value of the loss ($L_c$) is small when there is an agreement between image and mask gradients. This loss is added to the original binary cross entropy loss with a weight w, making the overall loss $$L = L_M + w L_C \quad \text{(Eq. 2)}$$

The combination of the two losses maintains the balance between being true to training masks while generating masks that adhere to image edges. This mask-image gradient consistency loss measure is used to both evaluate existing models and train a new model where the binary cross entropy (loss) measure is combined with this new measure of Eq. 1 as indicated in in Eq 2.

Cross-entropy loss or log loss measures the performance of a classification model whose output is a probability value between 0 and 1. Cross-entropy loss increases as the predicted probability diverges from the actual (true) label. In the present example, the model classifies each pixel in respective observations o as one of two classes c—hair, not hair—such that a binary cross entropy loss $L_M$ may be calculated as in Eq. 3:

$$L_M = -(y \log(p) + (1-y)\log(1-p)) \quad \text{(Eq. 3)}$$

where y is the binary label (0 or 1) for a correct classification for the observation o and p is the predicted probability that the observation o is of class c.

Figure 5:
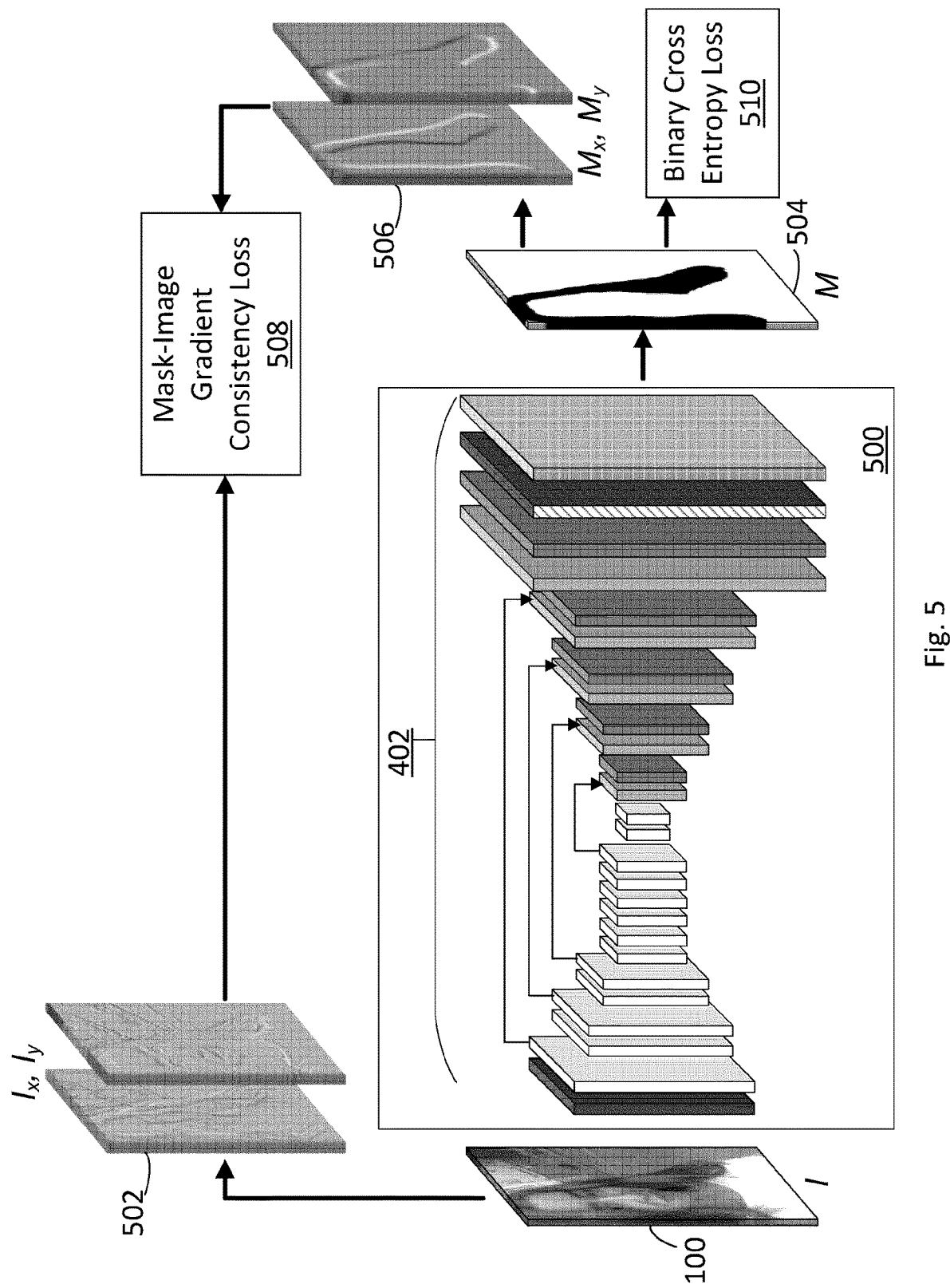
FIG. 5 is an illustration of a deep neural network architecture configured to use skip connections with mask-image gradient consistency loss measure training to process an image and produce an image mask as output in accordance with an example herein.

FIG. 5 shows a training architecture including network 500 with skip connections receiving image 100 (I) and producing mask 504 (M). Network 500 is comparable in structure to network 400 but is trained using the loss measures discussed.

Also shown is input 502 comprising $I_x, I_y$ (normalized image gradient) from image 100 and input 506 comprising $M_x, M_y$ (normalized mask gradient) to a mask-image gradient consistency loss determiner component 508 for the training. Also shown in a binary cross-entropy loss determiner component 510. The mask-image gradient consistency loss $L_C$ and binary cross-entropy loss $L_M$ are combined (not shown) to define a loss L parameter to train the network 500 as described above.

Thus the network 500 is a CNN that comprises a pre-trained network for image classification such as one pre-trained using open source image training data. The pre-trained network is adapted to define an object segmentation mask such as a hair segmentation mask rather than to classify the image per se. The CNN is further trained to minimize a mask-image gradient consistency loss when trained and may be so trained using coarse segmentation data. This mask-image gradient consistency loss may be combined with a binary cross entropy loss. The CNN is further adapted to use skip connections between layers in an encoder stage and corresponding layers in a decoder stage to combine low resolution but powerful features and high resolution but weak features when upsampling in the decoder stage to define the object segmentation mask.

Figure 6:
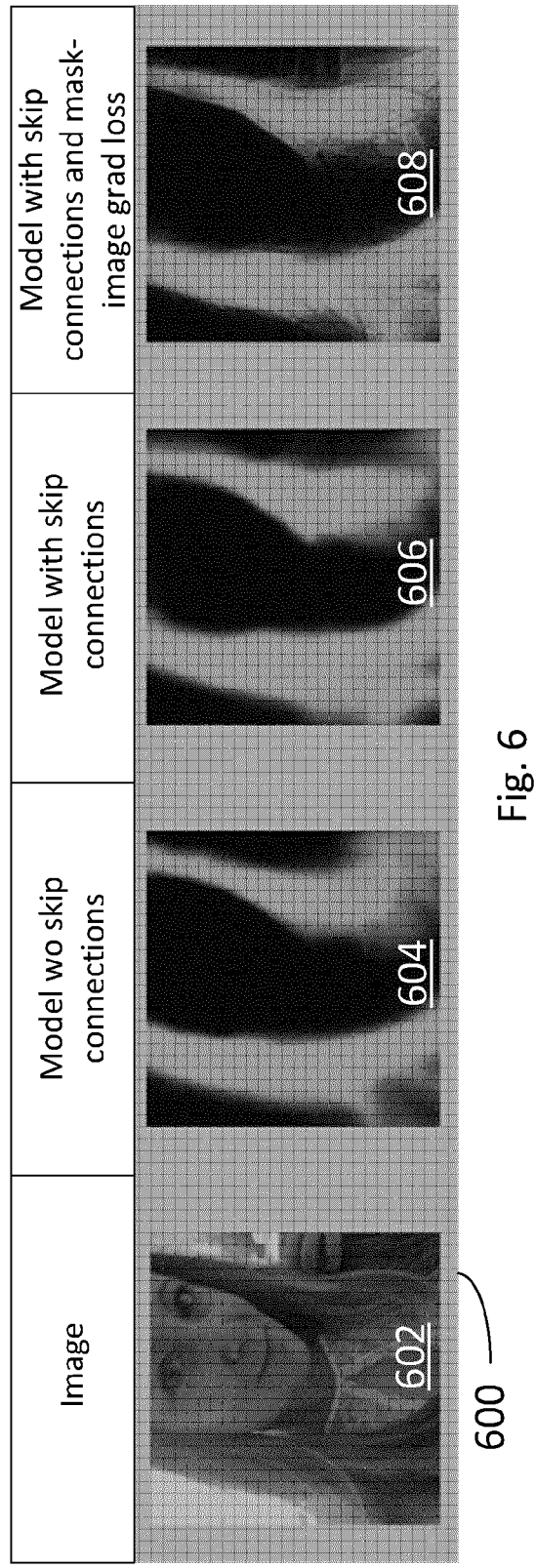
FIG. 6 is an image table of qualitative results for the neural network models of FIGS. 3-5.

The resulting masks look much more like mattes and are much more detailed. FIG. 6 shows an image table 600 depicting qualitative results. Shown is image 602 to be processed (an example of image 100) as well as respective masks (examples of masks 304, 404 and 504) produced using the models of FIGS. 3-5 respectively. Mask 604 was produced using a model without skip connections (Model 1) per FIG. 3, mask 606 was produced using a model with skip connections (Model 2) per FIG. 4 and masks 608 was produced using a model with skip connections and mask-image gradient consistency loss following training (Model 3) per FIG. 5.

Quantitatively, this method performs better according to the new consistency measure but slightly worse based on the rest (similarity to ground truth) of the measures. However, as mentioned earlier, given the current ground truth accuracy available, it may not be desired to maximize a prediction's agreement with ground truth beyond a certain level. Table 6 shows qualitative results of all the models using the same test data sets:

TABLE 6

| Mod. | Test Set | Prec. | Recall | F1 Score | IoU | Perform. | Acc. | Mask-Image Grad Cons. Loss | Gnd Truth Mask-Image Grad Cons. Loss |
|---|---|---|---|---|---|---|---|---|---|
| 1 | In-house Set 1 | 0.89406 | 0.93423 | 0.91045 | 0.84302 | 0.77183 | 0.95994 | 0.2539 | 0.175 |
|   | In-house Set 2 | 0.904836 | 0.92926 | 0.914681 | 0.84514 | 0.76855 | 0.95289 | 0.275 | 0.171 |
| 2 | In-house Set 1 | 0.88237 | 0.94727 | 0.91024 | 0.84226 | 0.770518 | 0.95817 | 0.2306 | 0.175 |
|   | In-house Set 2 | 0.908239 | 0.94196 | 0.92320 | 0.85971 | 0.79548 | 0.95699 | 0.2414 | 0.171 |
| 3 | In-house Set 1 | 0.93495 | 0.887203 | 0.89963 | 0.83444 | 0.748409 | 0.96119 | 0.095 | 0.175 |
|   | In-house Set 1 | 0.95587 | 0.87826 | 0.91198 | 0.842757 | 0.74259 | 0.95407 | 0.0912 | 0.171 |

Figure 7:
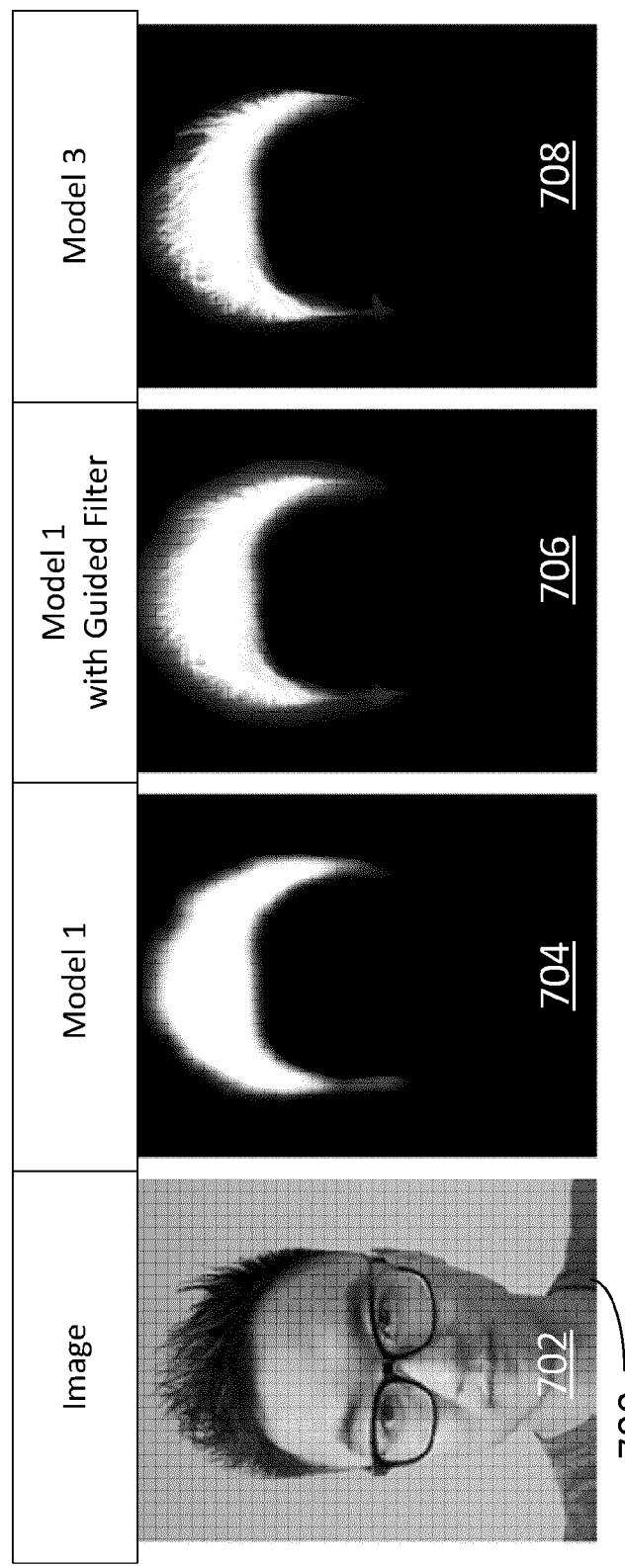
FIG. 7 is an image table of qualitative results for the neural network models of FIGS. 3 and 5.

The matte output of Model 3 of the architecture of FIG. 5 was compared to the coarser mask output of Model 1 of the architecture of FIG. 3 and with that output of Model 1 with the addition of a guided filter. A guided filter is an edge-preserving filter and has a linear runtime complexity with respect to the image size. It takes only 5 ms to process a 224×224 image on iPad Pro. FIG. 7 shows an image table 700 depicting qualitative results of models of FIGS. 3 and 5. Shown is image 702 to be processed (an example of image 100). Image 704 is the mask from Model 1 of FIG. 3, without guided filter post-processing. Image 706 is the mask from Model 1, with added guided filter post-processing. Image 708 is the mask (or matte) output from Model 3 of FIG. 5. As stated, Model 3 uses skip connections and is trained with the noisy and course segmentation data from crowd source data and is trained with the mask-images gradient consistency loss function.

Image 706 using the guided filter shows capturing more details, with individual hair strands becoming apparent. However, the guided filter adds detail only locally near the edges of the mask. Moreover, the edges of the refined masks have a visible halo around them, which becomes even more apparent when the hair color has lower contrast with its surroundings. This halo causes color bleeding during hair recoloring. The architecture of FIG. 5 yields sharper edges (as seen in image 708) and captures longer hair strands, without the unwanted halo effect seen in guided filter post-processing.

As an additional bonus, the architecture of FIG. 5 runs twice as fast compared to the architecture of FIG. 4, taking only 30 ms per frame on a mobile device and without the need for an extra post-processing matting step. Due to the use of skip connections, which help with capturing high resolution detail, the architecture of FIG. 5 maintains the original MobileNet encoder structure with the deepest layers having 7×7 resolution. These layers have many depth channels (1024) and become very expensive to process with increased resolution. Having a 7×7 resolution makes processing much faster compared to the 28×28 resolution in the architecture of FIG. 4.

Experiments

The method was evaluated on three datasets. First is the crowd-sourced dataset, consisting of 9000 training, 380 validation, and 282 testing images. All three subsets include the original images and their flipped versions. Since a target is hair matting on mobile devices, a pre-processing of the data is performed by detecting the face and cropping a region around it based on the scale expected for typical selfies.

To compare the method to existing approaches, two public datasets are evaluated: LFW Parts dataset of Kae et al. and the hair dataset of Guo and Aarabi. The former consists of 2927 250×250 images, with 1500 training, 500 validation, and 927 test images. Pixels are labeled into three categories: hair, skin, and background, generated at the superpixel level. The latter consists of 115 high-resolution images. Since it contains too few images to train on, we use our crowd-sourced training data when evaluating on this set. To make this dataset consistent with our training data, pre-processing in a similar manner is performed (using face detection and cropping), adding flipped images as well. Since in a few cases faces were not detected, the resulting dataset consists of 212 images.

Training is done using a batch size of 4 using the Adadelta (Adadelta: an adaptive learning rate method," arXiv preprint arXiv:1212.5701, 2012) method in Keras (F. Chollet et al., https://github.com/keras-team/keras, 2015), with learning rate 1:0, $\rho=0:95$, and $\varepsilon=1e-7$. L2 regularization is used with the weight $2 \cdot 10^{-5}$ for convolution layers only. Depthwise convolution layers and the last convolution layer are not regularized. The loss balancing weight is set to to $\omega=0:5$ in (Eq. 3).

In the three-class LFW data, only the hair class is contributing to the mask-image gradient consistency loss. The model is trained for 50 epochs and the best performing epoch selected using validation data. Training on crowd-sourced dataset takes 5 hours on Nvidia GeForce GTX 1080 Ti™ (Nvidia, GeForce and GTX 1080 Ti are trademarks of Nvidia Corporation) GPU and less than an hour on LFW Parts due to much smaller training set size.

A. Quantitative Evaluation

For quantitative performance analysis, the F1-score, Performance, IoU, and Accuracy are measured, averaged across all test images. To measure the consistency of image and hair mask edges, the mask-image gradient consistency loss (Eqn. 1) is also reported. Recall that during the manual clean-up in of crowd sourced images (image data) images were only filtered rather than corrected relative to the masks. As a result, the quality of the hair annotation is still poor. Therefore, prior to evaluation on the crowd-sourced data, manual correction of the test masks was undertaken, spending no more than 2 minutes per annotation. This yielded slightly better ground truth. Three variants of the method (model 1, Model 1 with guided filtering and Model 3) are evaluated on this relabeled data. All three methods perform similarly with respect to the ground truth comparison measures, however, Model 3 is the clear winner in the gradient consistency loss category, indicating that its masks adhere much better to image edges.

On the LFW Parts dataset, an on-par performance is reported with the best performing method in Qin et al., but it is achieved in real-time on a mobile device. Only the accuracy measure is used for evaluation since it is the only measure used in Qin et al. Arguably, especially since LFW Parts was annotated at the superpixel level, the ground truth there may not good enough for high-accuracy analysis. On the dataset of Guo and Aarabi there is reported an F1-score of 0:9376 and Performance of 0:8253. HNN was re-run on this post-processed dataset and obtained similar performance to that reported by the authors, with F1-score of 0:7673 and Performance of 0:4674.

B. Qualitative Evaluation

The method is evaluated on publicly available selfie images for qualitative analysis. Model 1 yields good but coarse masks. Model 1 with guided filter produces better masks but with an undesirable blur around hair boundaries. The most accurate and sharpest results are achieved by Model 3. A failure mode of both guided filter post-processing and Model 3 is their under-segmentation of hair-like objects in the vicinity of hair, such as eyebrows in case of dark hair or bright background for light hair.

In addition, highlights inside the hair can cause the hair mask from Model 3 to be non-homogeneous.

C. Network Architecture Experiments

Using the validation data, experiments with a number of decoder layer channels was undertaken, but it was observed that it does not have a large effect on accuracy, with 64 channels yielding the best results according to most measures. These experiments were done using the skip connections architecture in FIG. 4 without using the gradient consistency loss.

Howard et al. observed that MobileNets perform better given higher image resolution. Given a goal of accurate hair matting, experiments were undertaken using our Model 3, increasing the resolution beyond 224×224, which is the highest resolution MobileNet were trained on ImageNet. A qualitative comparison of masks inferred using Model 3 from 224×224 images vs. 480×480 images shows the 480× 480 results look more accurate around the hair edges, with longer hair strands being captured including those over a face (e.g., on the nose). However, the issues mentioned in the previous section are emphasized as well, with more of the hair mask bleeding into non-hair regions and the inside of the mask becoming non-homogeneous due to hair highlights. In addition, processing a larger image is significantly more expensive.

As noted above, the CNN is configured for run-time execution on a user's computing device such as a mobile device. It may be configured such that execution of the CNN is at least in part on a GPU of such a device to take advantage of processing (e.g. parallelization in such GPUs). In some implementations, execution may be on a CPU. It is understood that training environments to define a trained network using the coarse segmentation data (training data) may vary from run-time environments. Training environments may have higher processing capabilities and/or more storage to hasten training operations.

Figure 8:
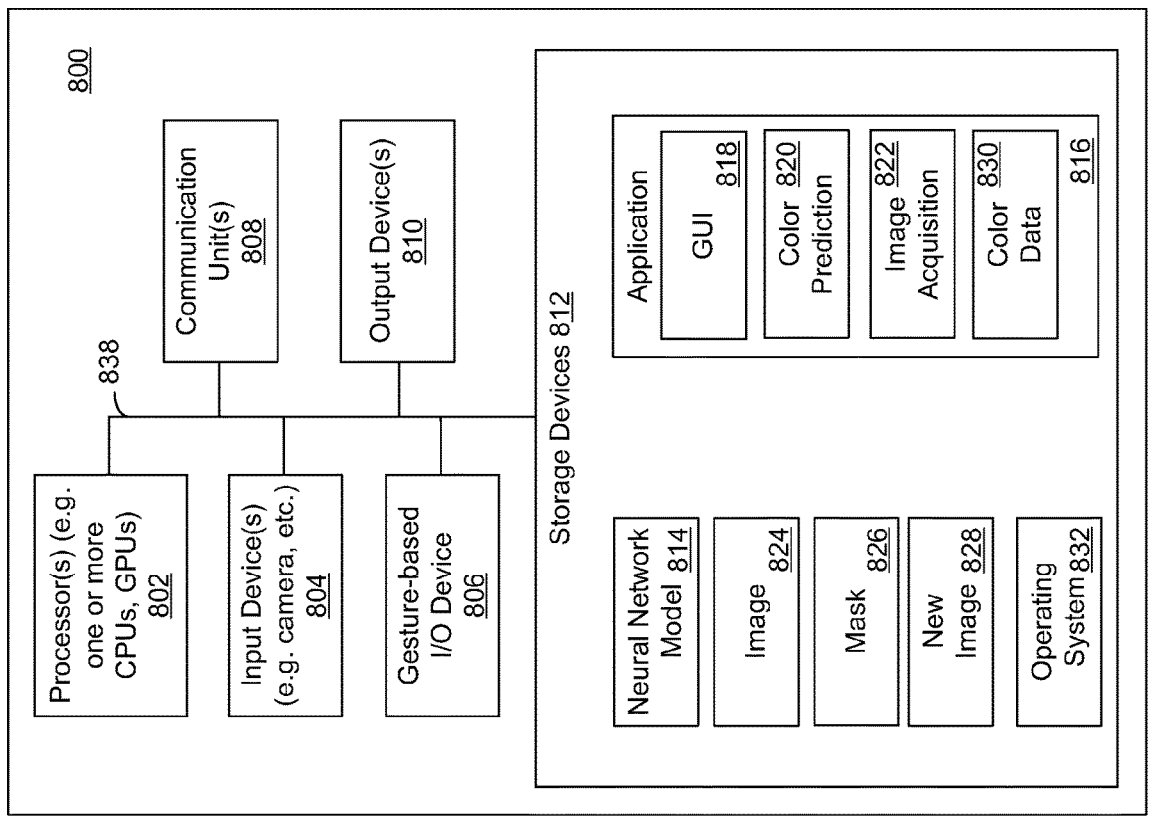
FIG. 8 is a block diagram of a computing device configured with a deep neural network to process images in accordance with an example herein.

FIG. 8 is a block diagram of an example computing device 800, in accordance with one or more aspects of the present disclosure, such as a handheld mobile device (e.g. a smartphone or tablet). However it may be another computing device such as a laptop, desktop, workstation, etc. As noted earlier, a goal of the investigation and development effort is to produce a deep neural network for operation on a handheld mobile device with limited resources to produce processed images (e.g. video) effectively and efficiently.

Computing device 800 comprises a user device, for example, to acquire one or more images such as a video and process the images to change one or more attributes and present new images. In one example, the images are processed to change a color of hair in the images. Computing device 800 comprises one or more processors 802, one or more input devices 804, a gesture-based I/O device 806, one or more communication units 808 and one or more output devices 810. Computing device 800 also includes one or more storage devices 812 storing one or more modules and/or data. Modules may include deep neural network model 814, application 816 having components for a graphical user interface (GUI 818), color prediction 820 and image acquisition 822. Data may include one or more images for processing (e.g. image 824), one or more masks generated from the one or more images (e.g. mask 826 generated from image 824), and one or more new images generated using the one or more masks and the one or more images (e.g. new image 828).

Application 816 provides the functionality to acquire one or more images such as a video and process the images to change one or more attributes and present new images. In one example, the images are processed to change a color of hair in the images. Application performs the image processing using a deep neural network as provided by neural network model 814. Network model may be configured as any of the models shown in FIGS. 3, 4 and 5.

Application 816 may be associated with certain attribute data such as color data 830 for changing one or more attributes of the image. Changing attributes relates to changing pixel values to create a new image. It is understood that image related data (e.g. for storing, printing and/or displaying images) may be represented using various color models and data formats and application 816 may be configured accordingly. In other examples, the attribute data may relate to changing an effect such a lighting conditions, texture, shape, etc. Application 816 may be configured with one or more functions for changing attribute(s) (not shown), for example, to apply an effect to the image at desired location (e.g. an object or portion thereof of interest in the image identified by the deep neural network).

Storage device(s) 212 may store additional modules such as an operating system 832 and other modules (not shown) including communication modules; graphics processing modules (e.g. for a GPU of processors 802); map module; contacts module; calendar module; photos/gallery module; photo (image/media) editor; media player and/or streaming module; social media applications; browser module; etc. Storage devices may be referenced as storage units herein.

Communication channels 838 may couple each of the components 802, 804, 806, 808, 810, 812, and any modules 814, 816 and 826 for inter-component communications, whether communicatively, physically and/or operatively. In some examples, communication channels 838 may include a system bus, a network connection, an inter-process communication data structure, or any other method for communicating data.

The one or more processors 802 may implement functionality and/or execute instructions within computing device 800. For example, processors 802 may be configured to receive instructions and/or data from storage devices 812 to execute the functionality of the modules shown in FIG. 8, among others (e.g. operating system, applications, etc.) Computing device 800 may store data/information to storage devices 812. Some of the functionality is described further herein below. It is understood that operations may not fall exactly within the modules 814, 816 and 826 of FIG. 8 such that one module may assist with the functionality of another.

Computer program code for carrying out operations may be written in any combination of one or more programming languages, e.g., an object oriented programming language such as Java, Smalltalk, C++ or the like, or a conventional procedural programming language, such as the "C" programming language or similar programming languages.

Computing device 800 may generate output for display on a screen of gesture-based I/O device 806 or in some examples, for display by a projector, monitor or other display device. It will be understood that gesture-based I/O device 806 may be configured using a variety of technologies (e.g. in relation to input capabilities: resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology; and in relation to output capabilities: a liquid crystal display (LCD), light emitting diode (LED) display, organic light-emitting diode (OLED) display, dot matrix display, e-ink, or similar monochrome or color display).

In the examples described herein, gesture-based I/O device 806 includes a touchscreen device capable of receiving as input tactile interaction or gestures from a user interacting with the touchscreen. Such gestures may include tap gestures, dragging or swiping gestures, flicking gestures, pausing gestures (e.g. where a user touches a same location of the screen for at least a threshold period of time) where the user touches or points to one or more locations of gesture-based I/O device 806. Gesture-based I/O device 806 and may also include non-tap gestures. Gesture-based I/O device 806 may output or display information, such as graphical user interface, to a user. The gesture-based I/O device 806 may present various applications, functions and capabilities of the computing device 800 including, for example, application 818 to view images, process the images and display new images, messaging applications, telephone communications, contact and calendar applications, Web browsing applications, game applications, e-book applications and financial, payment and other applications or functions among others.

Although the present disclosure illustrates and discusses a gesture-based I/O device 806 primarily in the form of a display screen device with I/O capabilities (e.g. touchscreen), other examples of gesture-based I/O devices may be utilized which may detect movement and which may not comprise a screen per se. In such a case, computing device 800 includes a display screen or is coupled to a display apparatus to present new images. Computing device 800 may receive gesture-based input from a track pad/touch pad, one or more cameras, or another presence or gesture sensitive input device, where presence means presence aspects of a user including for example motion of all or part of the user.

One or more communication units 808 may communicate with external devices (not shown) for example to receive new attribute data or application functionality, to share new images with another computing device, printing device or display device (all not shown) via one or more communication networks (not shown) by transmitting and/or receiving network signals on the one or more networks. The communication units may include various antennae and/or network interface cards, chips (e.g. Global Positioning Satellite (GPS)), etc. for wireless and/or wired communications.

Input devices 804 and output devices 810 may include any of one or more buttons, switches, pointing devices, cameras, a keyboard, a microphone, one or more sensors (e.g. biometric, etc.), a speaker, a bell, one or more lights, a haptic (vibrating) device, etc. One or more of same may be coupled via a universal serial bus (USB) or other communication channel (e.g. 838). A camera (an input device 804) may be front-oriented (i.e. on a same side as) to permit a user to capture image(s) using the camera while looking at the gesture based I/O device 806 to take a "selfie".

The one or more storage devices 812 may take different forms and/or configurations, for example, as short-term memory or long-term memory. Storage devices 812 may be configured for short-term storage of information as volatile memory, which does not retain stored contents when power is removed. Volatile memory examples include random access memory (RAM), dynamic random access memory (DRAM), static random access memory (SRAM), etc. Storage devices 812, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Though not shown, a computing device may be configured as a training environment to train neural network model 814 for example using the network as shown in FIG. 5 along with appropriate training and/or testing data.

Computing device 800 comprises a processing unit and a storage unit coupled to the processing unit. The storage unit stores instructions, which when executed by the processing unit, configure the computing device to: store and provide a deep learning neural network model (e.g. comprising a convolutional neural network) configured to classify pixels of an image to determine whether each of the pixels a member of an object of interest (e.g. is a hair pixel); and define and present a new image (e.g. a colored hair image) by changing one or more attributes of the pixels that are a member of the object of interest. Changing operations use a mask defined from the image using the deep neural network model. In one example, the object of interest is hair and the attribute is color. Thus changing one or more attributes applies a new hair color to hair pixels in the image using a hair segmentation mask.

The deep neural network is adapted to a light architecture for a computing device that is a mobile device (e.g. a smartphone or tablet) having fewer processing resources than a "larger" device such as a laptop, desktop, workstation, server or other comparable generation computing device.

The deep neural network model may be configured as a depthwise separable convolution neural network comprising convolutions in which individual standard convolutions are factorized into a depthwise convolution and a pointwise convolution. The depthwise convolution is limited to applying a single filter to each input channel and the pointwise convolution is limited to combining outputs of the depthwise convolution.

The deep neural network model may be further configured to comprise operations to perform skip connections, between layers in the encoder and corresponding layers in the decoder, such as when upsampling.

The deep neural network model may be trained using a mask-image gradient consistency loss measure whereby mask-image gradient consistency loss is determined relative to an image processed and a mask generated and the loss measure used train the model. Mask-image gradient consistency loss may be determined as per Eq. 1.

Figure 9:
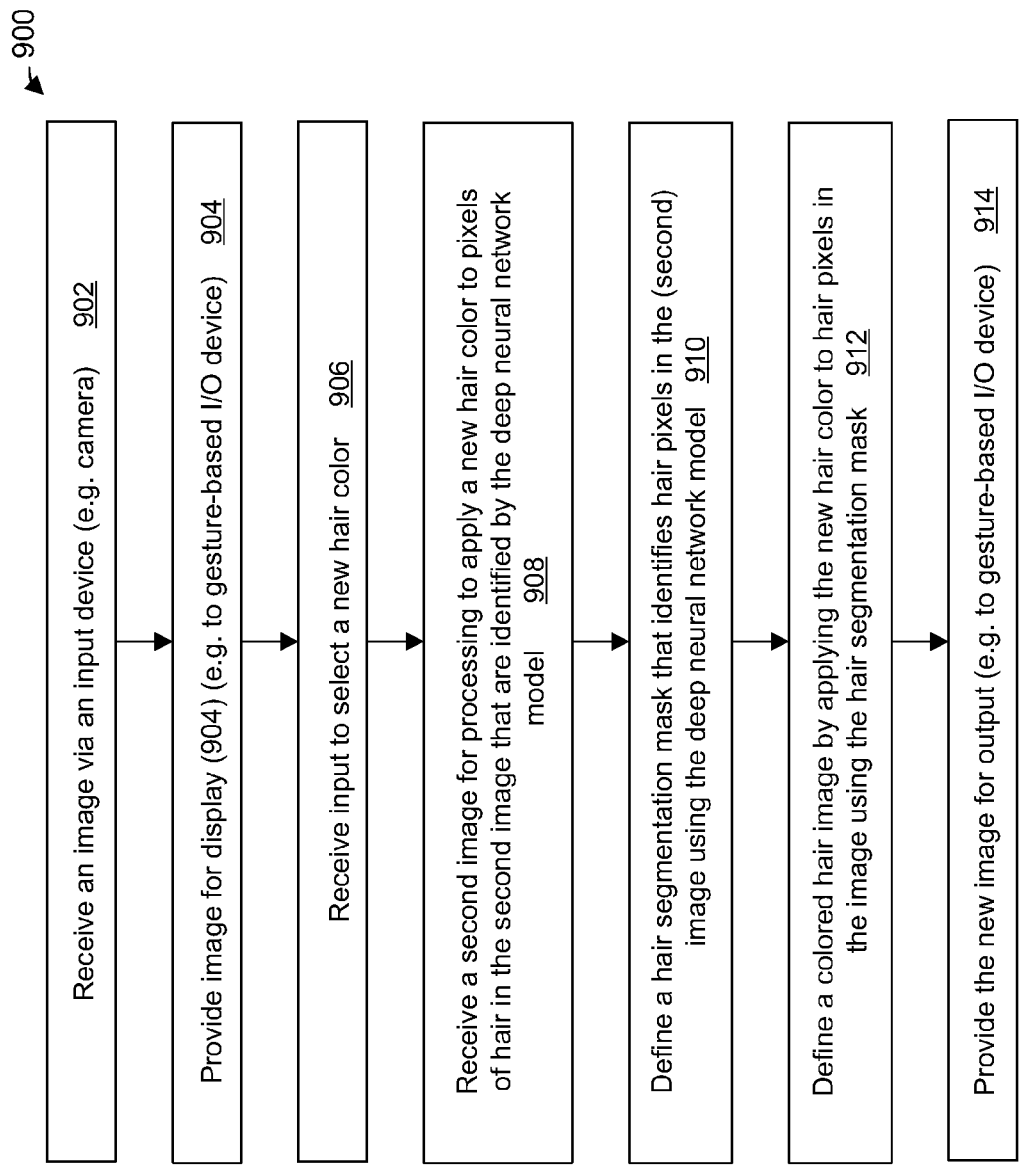
FIG. 9 is a flowchart of operations of a computing device of FIG. 8 in accordance with examples provided herein.

FIG. 9 is a flowchart of operations 900 of computing device 800 in accordance with an example. Operations 900 relate to a user of computing device 800 using an application such as application 816 to take a selfie comprising a video comprising video frames defining images of the user's head including the user's hair, selecting a new hair color and watching a video in which the hair color of the user's hair is the new hair color. At 902 operations receive an image via an input device or unit such as a camera which may invoke GUI 818 and image acquisition component 822. The image is provided for display (904) such as to gesture-based I/O device 806 or another display device. To assist with processing for hair on mobile devices, images (data) may be pre-processed (not shown). Images may be pre-processed by detecting the face and cropping a region around it based on the scale expected for typical selfies.

At 906, input is received via gesture-based I/O device 806 and GUI 818 (an interactive GUI) to select a new hair color. GUI 818 may be configured to present hair color data 814 via an interactive interface for selection. In some examples, application 816 may be configured to suggest a color. Though not shown, operations may include determining an existing or current hair color from the image received and optionally other color (e.g. skin color) or light information, etc. User preferences represented as data (not shown) may be solicited through GUI 818. Operations may further include providing same to the color prediction component 820. Color prediction component 820 may have a function to suggest an appropriate color (e.g. one or more candidates for new hair colors from color data 830) responsive to one or more of the existing hair color, skin or other color and/or light information, the user preferences, trends, etc.

At 908 operations receive a second image for processing to apply the new attribute, namely the new hair color, to pixels of hair in the second image that are identified by the deep neural network model 814 as described herein. As the camera is continually capturing images, the first image used to define an existing hair colour is no longer current.

At 910 operations define a hair segmentation mask that identifies hair pixels in the (second) image using model 814. At 912 operations define a new image (e.g. a colored hair image) by applying the new hair color to hair pixels in the image using the hair segmentation mask. At 914, operations provide the new image for output to gesture-based I/O device 806 in a GUI provided by GUI component 818. As further images are received from the camera, further respective masks are defined and further respective new image with colored hair are defined and presented.

Additional or alternative GUIs or GUI functions may be provided to facilitate other attribute changes, live comparisons of existing and new hair colors or two new hair colors or to save still images or video segments showing a new hair color. Operations may present a GUI via the gesture-based I/O device where the GUI comprises a first portion to view the image and a second portion to view the colored hair image simultaneously such as in a split screen arrangement.

Operations may apply a lighting conditions treatment to the hair color (existing or new color) to show the hair in a different lighting condition. Operations may be configured to show a first new hair color and a second new hair color in respective new images. A single mask may be defined and provided to two separate coloring operations to apply the two new hair colors. The respective new color images for the first and second colors may be provided sequentially or simultaneously.

Additionally or alternatively to any GUI interface options or controls discussed, voice activated controls may be provided.

Other light architectures may be adapted in a similar manner to produce a hair segmentation mask by using skip connections between corresponding layers of an encoder and decoder and trained using a mask-image gradient consistency loss function. One example of such an architecture is ShuffleNet™, a computation-efficient CNN designed especially for mobile devise with very limited computational power (e.g. 10-150 MFLOPs) using pointwise group convolution and channel shuffle of Zhang et al and Megvii Technology Limited. Details regarding ShuffleNet are provided in ShuffleNet: An Extremely Efficient Convolutional Neural Network for Moble Devices of Zhang et al. arXiv: 1707.01083v2 [cs:CV] 7 Dec. 2017 incorporated herein by reference.

Figure 10:
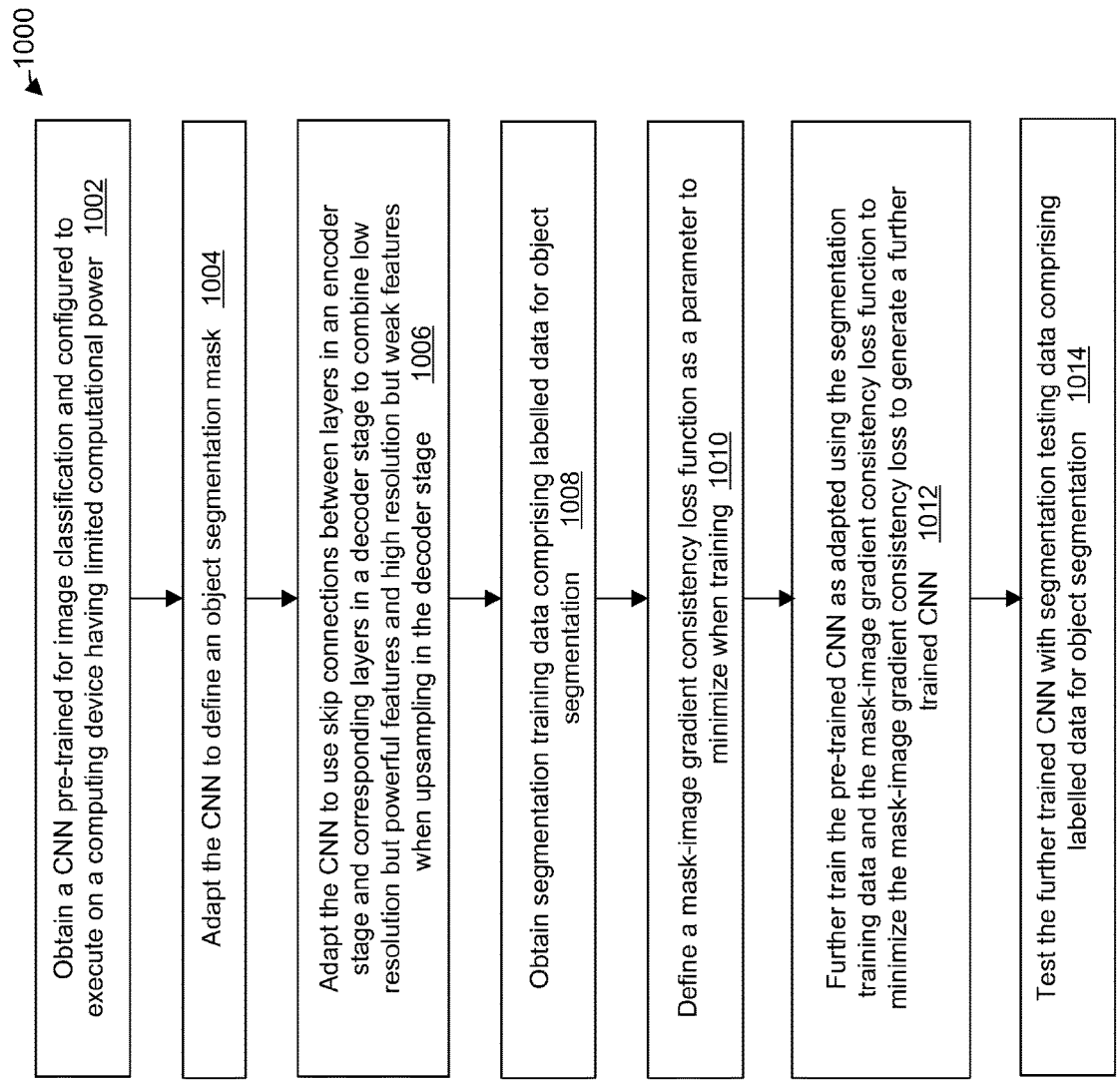
FIG. 10 is a flowchart of steps to define an exemplary CNN in accordance with a teaching herein.

FIG. 10 is a flowchart of steps 1000 to define an exemplary CNN in accordance with a teaching herein. At 1002, a CNN pre-trained for image classification and configured to execute on a computing device having limited computational power is obtained (e.g. MobileNet, ShuffleNet, etc.)

At 1004 a step adapts the CNN to define an object segmentation mask, for example, removing full connected layers, defining upsampling operations, etc. At 1006 a step adapts the CNN to use skip connections between layers in an encoder stage and corresponding layers in a decoder stage to combine low resolution but powerful features and high resolution but weak features when upsampling in the decoder stage. At 1008 a step is performed to obtain segmentation training data comprising labelled data for object segmentation. As noted this may be crowd sourced and be noisy and coarse segmentation data where the object segmentation mask (labelling) is not fine.

A step 1010 is performed to define a mask-image gradient consistency loss function as a parameter to minimize when training. At 1012 a step is performed to further train the pre-trained CNN as adapted using the segmentation training data and the mask-image gradient consistency loss function to minimize the mask-image gradient consistency loss to generate a further trained CNN. At 1014 the further trained CNN is tested with segmentation testing data comprising labelled data for object segmentation. It will be apparent that some of the steps in FIG. 10 are optional. For example and not limitation, adapting to use skip connections may be optional. Adapting to minimize the gradient consistency loss (and thus similarly training for such loss) may be optional. The training data may be noisy and course segmentation (e.g. without fine labelling) such as obtained from crowd source data.

The thus trained CNN may be provided for storing and using on a mobile device as described.

In addition to computing device aspects, a person of ordinary skill will understand that computer program product aspects are disclosed, where instructions are stored in a non-transient storage device (e.g. a memory, CD-ROM, DVD-ROM, disc, etc.) to configure a computing device to perform any of the method aspects stored herein.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What we claim is:

1. A computing device to process an image comprising:
a storage unit to store and provide a convolutional neural network (CNN) configured to classify pixels of the image to determine whether each of the pixels is an object pixel or not an object pixel to define an object segmentation mask for an object in the image, wherein the CNN comprises a pre-trained network for image classification adapted to define the object segmentation mask; wherein the CNN is further trained to minimize a mask-image gradient consistency loss; and wherein the CNN is further trained using segmentation data; and
a processing unit coupled to the storage unit configured to process the image using the CNN to generate the object segmentation mask to define a new image.

2. The computing device according to claim 1 wherein the mask-image gradient consistency loss $L_c$ is defined as:

$$L_c = \frac{\sum M_{mag}[1 - (I_x M_x + I_y M_y)^2]}{\sum M_{mag}},$$

where $I_x, I_y$ are normalized image gradient and $M_x, M_y$ are normalized mask gradient and $M_{mag}$ is mask gradient magnitude.

3. The computing device according to claim 2 wherein the mask-image gradient consistency loss $L_C$ is combined with a binary cross entropy loss $L_M$ with a weight w, to minimize an overall loss L when training where L is defined as $L=L_M+wL_C$.

4. A computing device to process an image comprising:
a storage unit to store and provide a convolutional neural network (CNN) configured to classify pixels of the image to determine whether each of the pixels is an object pixel or not an object pixel to define an object segmentation mask for an object in the image, wherein the CNN comprises a pre-trained network for image classification adapted to define the object segmentation mask and wherein the CNN is further trained using segmentation data; and
a processing unit coupled to the storage unit configured to process the image using the CNN to generate the object segmentation mask to define a new image;
wherein the computing device is adapted to use skip connections between layers in an encoder stage and corresponding layers in a decoder stage to combine low resolution but powerful features and high resolution but weak features when upsampling in the decoder stage to define the object segmentation mask.

5. A computing device to process an image comprising:
a storage unit to store and provide a convolutional neural network (CNN) configured to classify pixels of the image to determine whether each of the pixels is an object pixel or not an object pixel to define an object segmentation mask for an object in the image, wherein the CNN comprises a pre-trained network for image classification adapted to define the object segmentation mask and wherein the CNN is further trained using segmentation data; and
a processing unit coupled to the storage unit configured to process the image using the CNN to generate the object segmentation mask to define a new image
wherein the processing unit is configured to provide an interactive graphical user interface (GUI) to display the image and the new image, the interactive GUI configured to receive input to determine the change to define the new image.

6. The computing device according to claim 5 wherein the segmentation data is noisy and course segmentation data.

7. The computing device according to claim 5 wherein the segmentation data is crowd-sourced segmentation data.

8. The computing device according to claim 5 wherein the object is hair.

9. The computing device according to claim 5 wherein the processing unit is configured to define the new image from the image by applying a change to pixels in the image selected using the object segmentation mask.

10. The computing device according to claim 9 wherein the change is a change of color.

11. The computing device according to claim 5 wherein the CNN comprises a trained network configured to run on a mobile device with limited computational power to produce the new image as a video image in real time.

12. The computing device according to claim 5 wherein the processing unit is configured to analyze pixels of the object in the image using the object segmentation mask to determine one or more candidates for the change and wherein the interactive GUI is configured to present the one or more candidates to receive input to select a one of the candidates to apply as the change.

13. The computing device according to claim 5 wherein the image is a selfie video.

14. A computing device to process an image comprising:
a processing unit, a storage unit coupled to the processing unit and an input device coupled to at least one of the processing unit and the storage unit, the storage unit storing instructions which when executed by the processing unit configure the computing device to:
receive the image via the input device;
define a hair segmentation mask that identifies hair pixels in the image;
define a colored hair image by applying a new hair color to hair pixels in the image using the hair segmentation mask; and
provide the colored hair image for output to a display device; and wherein the hair segmentation mask is defined by:
processing the image using a convolutional neural network (CNN) stored by the storage unit to apply a plurality of convolutional (cony) filters in a succession of cony layers to detect respective features, where a first set of cony layers in the succession provides output which down samples the image from a first image resolution down to a minimum resolution and a second set of cony layers in the succession upsamples the output back to the first image resolution, and the CNN being trained to minimise a mask-image gradient consistency loss to define the hair segmentation mask.

15. The computing device of claim 14 wherein the CNN is adapted to use skip connections between corresponding cony layers from the first set and the second set.

16. The computing device according to claim 14 wherein the CNN comprises an upsampling function interspersed before an initial layer of the second set of cony layers and before respective subsequent layers of the second set of cony layers to upsample output to the first image resolution.

17. The computing device according to claim 16 wherein the upsampling function uses respective skip connections, each of the respective skip connections combining:
a first activation map that is output from an adjacent cony layer in the succession as input to the next cony layer of the second set of cony layers; and
a second activation map that is output from an earlier cony layer in the first set of cony layers, where the second activation map has a larger image resolution than the first activation map.

18. The computing device according to claim 17 wherein each of the respective skip connections is defined to add an output of a cony 1×1 filter applied to the second activation map with an output of an upsampling function applied to the first activation map to increase resolution of the first activation map to the larger image resolution.

19. The computing device according to claim 14 wherein the instructions configure the computing device to present a graphical user interface (GUI) via the display device, the GUI comprising a first portion to view the image and a second portion to view the colored hair image simultaneously.

20. The computing device according to claim 19 wherein instructions configure the computing device to apply a lighting conditions treatment to the new hair color in the colored hair image to show the new hair color in a different lighting condition.

21. The computing device according to claim 14 wherein the new hair color is a first new hair color and the colored hair image is a first colored hair image and wherein the instructions configure the computing device to:
define and present a second colored hair image by applying a second new hair color to hair pixels in the image using the hair segmentation mask and by providing the second colored hair image for output to the display device.

22. The computing device according to claim 21 wherein the instructions configure the computing device to present a two new color GUI via the display device, the two new color GUI comprising a first new color portion to view the first colored hair image and a second new color portion to view the second colored hair image simultaneously.

23. The computing device according to claim 14 wherein the instructions configure the computing device to:
analyze the image for color including a current hair color of hair pixels in the image;
determine one or more suggested new hair colors; and
present the suggested new hair colors via an interactive portion of the GUI to select the new hair color to define the colored hair image.

24. The computing device according to claim 14 wherein the processing unit comprises a graphics processing unit (GPU) to execute the CNN and the computing device comprises one of a smartphone and a tablet.

25. The computing device according to claim 14 wherein the image is one of a plurality of video images of a video and wherein the instructions configure the computing device to process the plurality of video images to change hair color.

26. The computing device according to claim 14 wherein the CNN comprises a MobileNet based model adapted to classify pixels of the image to determine whether each of the pixels is a hair pixel.

27. The computing device according to claim 14 wherein the CNN is configured as a depthwise separable convolution neural network comprising convolutions in which individual standard convolutions are factorized into a depthwise convolution and a pointwise convolution, the depthwise convolution limited to applying a single filter to each input channel and the pointwise convolution limited to combining outputs of the depthwise convolution.

28. The computing device according to claim 14 wherein the mask-image gradient consistency loss $L_c$ is defined as:

$$L_c = \frac{\sum M_{mag}[1 - (I_x M_x + I_y M_y)^2]}{\sum M_{mag}}$$

where $I_x, I_y$ are normalized image gradient and $M_x, M_y$ are normalized mask gradient and $M_{mag}$ is a mask gradient magnitude.

29. A method to process an image comprising:
receiving via a processing unit the image;
defining via the processing unit a hair segmentation mask that identifies hair pixels in the image;
defining via the processing unit a colored hair image by applying a new hair color to hair pixels in the image using the hair segmentation mask; and
providing via the processing unit the colored hair image for output to a display device; and
wherein the hair segmentation mask is defined by:
processing the image using a convolutional neural network (CNN) stored by a storage unit coupled to the processing unit to apply a plurality of convolutional (cony) filters in a succession of cony layers to detect respective features and the CNN being trained with noisy and course segmentation data and to minimise a mask-image gradient consistency loss to define the hair segmentation mask.

* * * * *